United States Patent
Fujii et al.

(10) Patent No.: US 10,409,192 B2
(45) Date of Patent: *Sep. 10, 2019

(54) OPTICAL SCANNER AND IMAGE FORMING DEVICE INCORPORATING SAME

(71) Applicant: Ricoh Company, Ltd., Tokyo (JP)

(72) Inventors: Tomoya Fujii, Kanagawa (JP); Tadashi Nakamura, Tokyo (JP); Nobuyuki Arai, Kanagawa (JP); Yoshinobu Sakaue, Kanagawa (JP); Noboru Kusunose, Kanagawa (JP); Daisuke Imaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,011

(22) Filed: Nov. 7, 2017

(65) Prior Publication Data

US 2018/0088485 A1 Mar. 29, 2018

Related U.S. Application Data

(62) Division of application No. 14/643,122, filed on Mar. 10, 2015, now Pat. No. 9,864,296.

(30) Foreign Application Priority Data

Mar. 17, 2014 (JP) .................................. 2014-053495
Oct. 20, 2014 (JP) .................................. 2014-214071

(51) Int. Cl.
*G03G 15/043* (2006.01)
*G02B 26/12* (2006.01)
*G03G 15/04* (2006.01)

(52) U.S. Cl.
CPC ....... *G03G 15/0435* (2013.01); *G02B 26/124* (2013.01); *G02B 26/127* (2013.01); *G03G 15/04045* (2013.01)

(58) Field of Classification Search
CPC ......... G03G 15/0435; G03G 15/04045; G02B 26/124; G02B 26/127
See application file for complete search history.

(56) References Cited

U.S. PATENT DOCUMENTS 6,057,537 A 5/2000 Schubert
6,124,948 A 9/2000 Kamioka
(Continued)

FOREIGN PATENT DOCUMENTS

JP 10-010446 1/1998
JP 2001-004948 1/2001
(Continued)

OTHER PUBLICATIONS

Office Action dated Jul. 6, 2018 in corresponding Japanese Patent Application No. 2014-214071, 2 pages.

*Primary Examiner* — Lamson D Nguyen
(74) *Attorney, Agent, or Firm* — Oblon, McClelland, Maier & Neustadt, L.L.P.

(57) ABSTRACT

An optical scanner includes a light source including a plurality of light emitting elements, a polygon mirror which deflects light from the light source for scanning a surface of a subject, an optical element arranged between the light source and the polygon mirror, having optical power in a sub scanning direction, a synchronous detector which detects the light deflected by the polygon mirror for synchronous detection and generates a signal for controlling a timing at which the scanning of the surface is started, and a fixing element which secures one end of the optical element. The light emitting elements of the light source are aligned with a certain tilt angle relative to the sub scanning direction. Light from one of the light emitting elements disposed closest to the fixing element in a main scanning direction is used for synchronous detection.

3 Claims, 22 Drawing Sheets

(56) References Cited

U.S. PATENT DOCUMENTS

| | | |
|---|---|---|
| 6,317,245 B1 | 11/2001 | Hama et al. |
| 6,567,201 B1 | 5/2003 | Tsuchida |
| 8,922,863 B2 | 12/2014 | Tokita |
| 9,864,296 B2 * | 1/2018 | Fujii ................ G03G 15/0435 |
| 2005/0174418 A1 | 8/2005 | Sakaue et al. |
| 2006/0055769 A1 | 3/2006 | Yamazaki et al. |
| 2007/0053040 A1 | 3/2007 | Sakaue et al. |
| 2007/0064087 A1 | 3/2007 | Matsumae et al. |
| 2007/0153079 A1 | 7/2007 | Sakaue et al. |
| 2007/0188589 A1 | 8/2007 | Kusunose et al. |
| 2008/0055690 A1 | 3/2008 | Nakamura et al. |
| 2008/0062491 A1 | 3/2008 | Nakamura et al. |
| 2008/0192323 A1 | 8/2008 | Nakamura et al. |
| 2008/0204841 A1 | 8/2008 | Suzuki et al. |
| 2008/0218829 A1 | 9/2008 | Nakamura |
| 2008/0219601 A1 | 9/2008 | Arai et al. |
| 2008/0225105 A1 | 9/2008 | Kudo |
| 2008/0225304 A1 | 9/2008 | Sakaue et al. |
| 2008/0285104 A1 | 11/2008 | Arai et al. |
| 2009/0022520 A1 | 1/2009 | Sakaue et al. |
| 2009/0058981 A1 | 3/2009 | Higaki et al. |
| 2009/0066780 A1 | 3/2009 | Bannai et al. |
| 2009/0074459 A1 | 3/2009 | Nakamura et al. |
| 2009/0141316 A1 | 6/2009 | Arai et al. |
| 2009/0195636 A1 | 8/2009 | Arai et al. |
| 2009/0201358 A1 | 8/2009 | Nakamura |
| 2009/0220276 A1 | 9/2009 | Bannai et al. |
| 2010/0034563 A1 | 2/2010 | Funato et al. |
| 2011/0012982 A1 | 1/2011 | Arai |
| 2011/0052263 A1 | 3/2011 | Tatsuno et al. |
| 2011/0122217 A1 | 5/2011 | Arai et al. |
| 2011/0221857 A1 | 9/2011 | Tatsuno et al. |
| 2011/0316957 A1 | 12/2011 | Sakaue et al. |
| 2012/0062685 A1 | 3/2012 | Serizawa et al. |
| 2012/0177409 A1 | 7/2012 | Arai et al. |
| 2012/0236380 A1 | 9/2012 | Miyatake et al. |
| 2012/0300007 A1 | 11/2012 | Fujii et al. |
| 2013/0016171 A1 | 1/2013 | Nakamura et al. |
| 2013/0083148 A1 | 4/2013 | Miyatake et al. |
| 2013/0188004 A1 | 7/2013 | Arai et al. |
| 2013/0194370 A1 | 8/2013 | Sakaue et al. |
| 2013/0201536 A1 | 8/2013 | Nakamura et al. |
| 2013/0235143 A1 | 9/2013 | Itami et al. |

FOREIGN PATENT DOCUMENTS

| | | |
|---|---|---|
| JP | 2001-021819 | 1/2001 |
| JP | 2004-287237 A | 10/2004 |
| JP | 2006-035703 | 2/2006 |
| JP | 2006-162739 | 6/2006 |
| JP | 2008-225060 | 9/2008 |
| JP | 2012-113011 | 6/2012 |
| JP | 2014-013329 | 1/2014 |

* cited by examiner

FIG.10
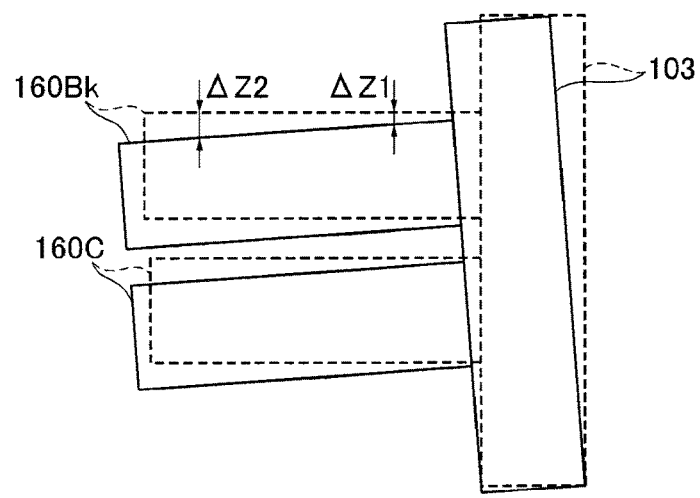
FIG.11A
FIG.11B
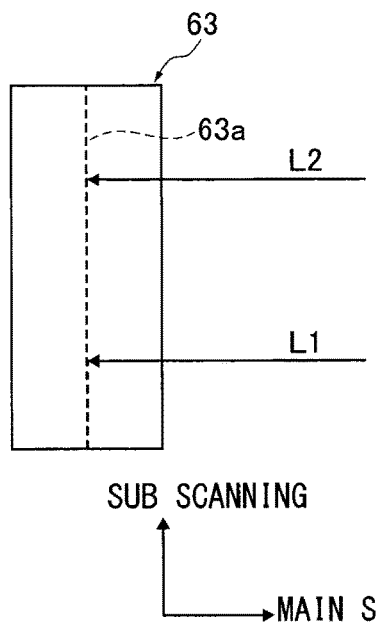
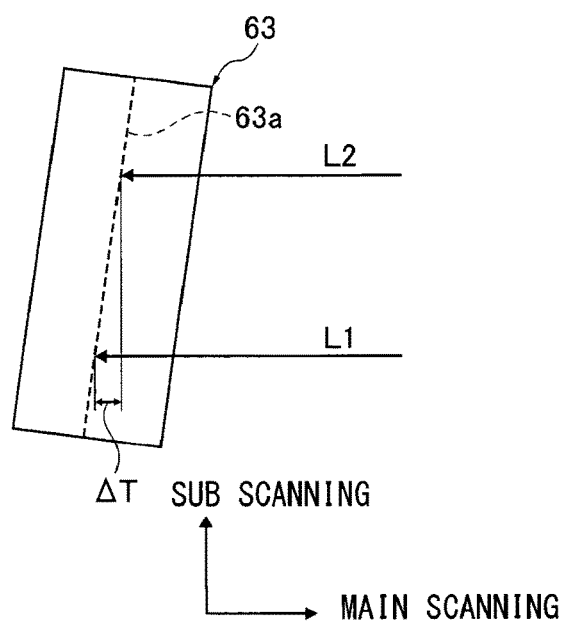

OPTICAL SCANNER AND IMAGE FORMING DEVICE INCORPORATING SAME

CROSS REFERENCE TO RELATED APPLICATION

The present application is a divisional of U.S. patent application Ser. No. 14/643,122, filed Mar. 10, 2015, which is based on and claims priority from Japanese Patent Application No. 2014-53495, filed on Mar. 17, 2014 and No. 2014-214071, filed on Oct. 20, 2014, the disclosure of which is hereby incorporated by reference in its entirety.

BACKGROUND OF THE INVENTION

Field of the Invention

The present invention relates to an optical scanner and an image forming device incorporating the same.

Description of the Related Art

It is known to form a latent image on a photoconductor as a latent image bearer by deflecting and scanning light in accordance with image information and develop the latent image to create an image. An optical scanner deflects light for scanning and comprises a light source as a laser diode (LD), an optical element as a cylindrical lens to adjust a shape of light from the light source, and a polygon mirror to rotate to deflect the adjusted light for scanning. Prior to writing an image on the photoconductor, the optical scanner controls light to be incident on the polygon mirror and a synchronous sensor in order to acquire write start timing. Then, it starts turning on the light for writing an image on the basis of a synchronous detection signal generated by the synchronous detector.

Japanese Laid-open Patent Application Publication No. 2014-13329 discloses an optical scanner comprising a cylindrical lens having an optical power along a rotational axis (hereinafter, sub scanning direction) of a polygon mirror. The cylindrical lens is cantilevered. Specifically, one end of the cylindrical lens in a main scanning direction orthogonal to both of the optical axis and the sub scanning direction is secured by adhesion on a fixed wall parallel to the main scanning direction.

An optical housing accommodating the light source, optical elements and a polygon scanner is thermally expanded because of heat emission from high-speed rotation of a polygon mirror of the polygon scanner. Due to the thermal expansion, the fixed wall may be tilted, changing the posture of the cylindrical lens accordingly. Along with a postural change, the position at which light is incident on the cylindrical lens is varied in the sub scanning direction. Since the cylindrical lens exerts optical power in the sub scanning direction, the exit position of light from the cylindrical lens changes in the sub scanning direction.

With no tilt of a light receiving surface of the synchronous sensor in the sub scanning direction, the synchronous sensor can detect the light to start writing at proper timing irrespective of a change in the light exit position from the cylindrical lens. However, the light-receiving surface of the synchronous sensor may be tilted relative to the sub scanning direction because of a manufacturing error in a mount on which a unit including the synchronous sensor is disposed or an assembly error in the unit and the mount. In this case, along with the change of light emitted from the cylindrical lens in the sub scanning direction, the synchronous sensor cannot detect the light at the correct timing for synchronous detection. As a result, write start timing is shifted from the right timing so that it is not able to form an image on a desired position of a paper.

SUMMARY OF THE INVENTION

The present invention aims to provide an optical scanner and an image forming device which can reduce a shift in write start timing from proper timing when the light-receiving surface of a synchronous detector is tilted relative to a sub scanning direction.

An optical scanner comprises a light source including a plurality of light emitting elements, a polygon mirror which deflects light from the light source for scanning a surface of a subject, an optical element arranged between the light source and the polygon mirror, having optical power in a sub scanning direction, the sub scanning direction being along a rotational axis of the polygon mirror, a synchronous detector which detects the light deflected by the polygon mirror for synchronous detection and generates a signal for controlling a timing at which the scanning of the surface is started, and a fixing element which secures one end of the optical element, wherein the light emitting elements of the light source are aligned with a certain tilt angle relative to the sub scanning direction, and light from one of the light emitting elements disposed closest to the fixing element in a main scanning direction is used for the synchronous detection, the main scanning direction being orthogonal to the sub scanning direction and an optical axis.

BRIEF DESCRIPTION OF THE DRAWINGS

Features, embodiments, and advantages of the present invention will become apparent from the following detailed description with reference to the accompanying drawings:

FIG. 10 shows a tilt of a mount for a cylindrical lens;

FIG. 11A shows light incident on the light receiving surface of a synchronous detector with no tilt relative to the sub scanning direction and FIG. 11B shows the same with a tilt;

DETAILED DESCRIPTION OF THE PREFERRED EMBODIMENT

Hereinafter, embodiments of a photocopier as one example of an electrophotographic image forming device will be described in detail with reference to the accompanying drawings.

Wherever possible, the same reference numbers will be used throughout the drawings to refer to the same or like parts.

First Embodiment

Figure 1:
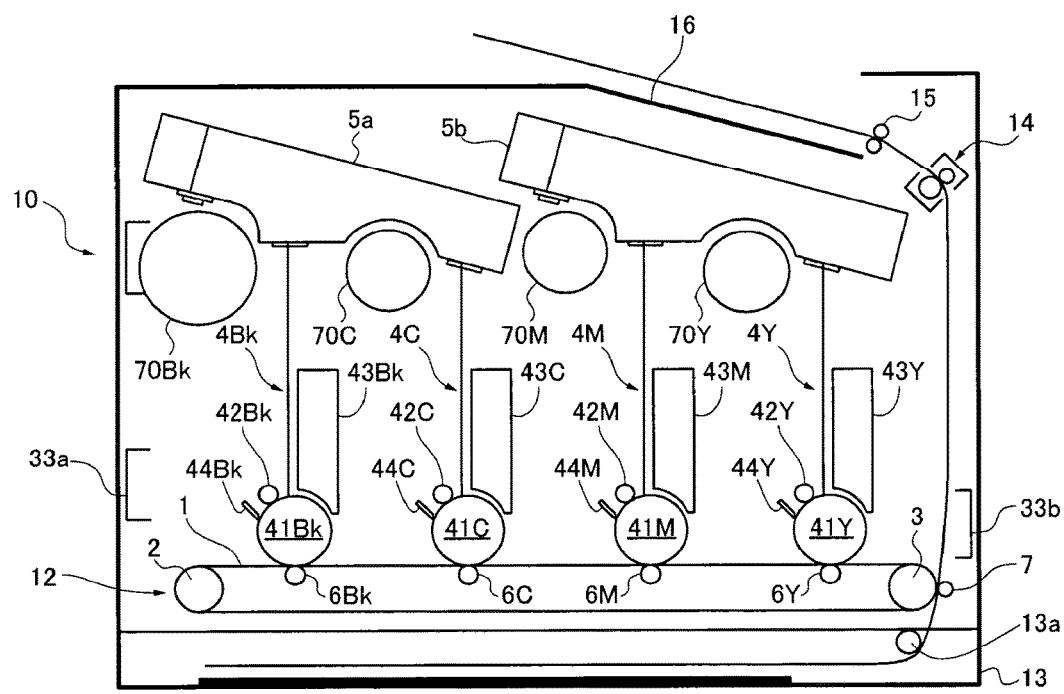
FIG. 1 shows a printer as one example of image forming device according to a first embodiment.

FIG. 1 shows a printer 10 as an example of image forming device according to the present embodiment. The printer 10 comprises four image forming units 4Y (yellow), 4M (magenta), 4C (cyan), 4Bk (black), an intermediate transfer belt 4, and first and second writing devices 5a, 5b transversely arranged over the image forming units 4Y, 4M, 4C, 4Bk and overlapping each other. Note that four-color related elements are added with codes, Y, M, C, Bk.

Each of the writing devices 5a, 5b is configured to receive color-separated image data from a personal computer, a word processor or the like to convert it to signals and drive a semiconductor laser in a laser unit to emit light beams in accordance with the signals.

The image forming units 4Y, 4M, 4C, 4Bk each include four photoconductors 41Y, 41M, 41C, 41Bk to rotate, and chargers 42Y, 42M, 42C, 42Bk, developing units 43Y, 43M, 43C, 43Bk, and cleaners 44Y, 44M, 44C, 44Bk disposed around the photoconductors 41Y, 41M, 41C, 41Bk, respectively. The photoconductors 41Y, 41M, 41C, 41Bk are cylindrical drums and rotated by a not-shown driver. The chargers 42Y, 42M, 42C, 42Bk evenly charge the surfaces of the corresponding photoconductors 41Y, 41M, 41C, 41Bk to have a predetermined potential. In the present embodiment the chargers 42Y, 42M, 42C, 42Bk are a contact charging type, for example, charge rollers to contact or closely approaching the surfaces of the photoconductors 41Y, 41M, 41C, 41Bk. However, the chargers should not be limited thereto.

The first writing device 5a spot-scans the evenly charged surfaces of the photoconductors 41Bk, 41C with light beams, thereby writing electrostatic latent images in accordance with image information. Similarly, the second writing device 5b spot-scans the evenly charged surfaces of the photoconductors 41M, 41Y with light beams, thereby writing electrostatic latent images in accordance with image information.

The developing units 43Y, 43M, 43C, 43Bk attach toner onto the electrostatic latent images on the photoconductors 41Y, 41M, 41C, 41Bk, respectively, to form toner images. In the present embodiment the developing units are a non-contact developing type to supply toner to the photoconductors 41Y, 41M, 41C, 41Bk in non-contact manner. The cleaners 44Y, 44M, 44C, 44Bk are blades to remove remnant toner or unwanted materials from the surfaces of the photoconductors 41Y, 41M, 41C, 41Bk, respectively.

A transfer unit 12 is disposed below the image forming units 4Y, 4M, 4C, 4Bk, in which the intermediate transfer belt 1 is endlessly extended and moved counterclockwise in FIG. 1. The transfer unit 12 comprises a tension roller 2, a secondary transfer roller 3, four primary transfer rollers 6Y, 6M, 6C, 6Bk, a secondary transfer roller 7, and a not-shown belt cleaner in addition to the intermediate transfer belt 1.

A paper cassette 13 containing sheets of paper is disposed below the transfer unit 12. A paper feeding roller 13a contacts an uppermost sheet and rotates counterclockwise at certain timing to feed the sheet.

The toner images on the photoconductors 41Y, 41M, 41C, 41Bk are transferred and superimposed serially on the intermediate transfer belt 1 by the primary transfer rollers 6Y, 6M, 6C, 6Bk. The toner images are then transferred onto a paper sheet from the intermediate transfer belt 1 by the secondary transfer roller 7. The paper sheet is carried to a fixing unit to apply heat and pressure on the sheet and fix the images. Then, the paper sheet is ejected onto the paper ejection tray 16 via a paper ejection roller pair 15.

Next, the first and second writing devices 5a, 5b are described. The first and second writing devices 5a, 5b are tilted approximately in parallel to a tilt of the paper ejection tray 16 and partially overlap as seen from the paper ejection side. The parallel and overlapping structure contributes to downsizing the printer 10.

Figure 2:
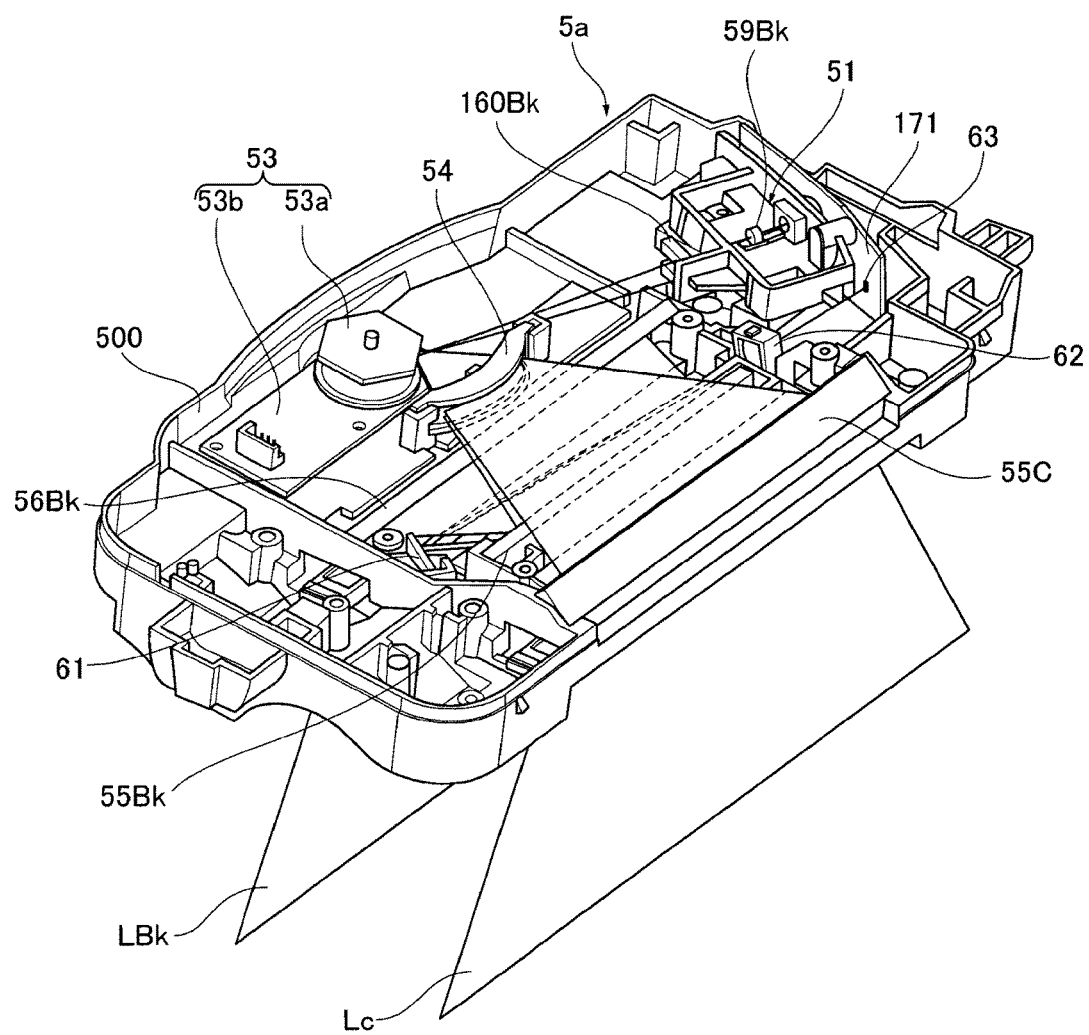
FIG. 2 is a perspective view of the periphery of a first writing device.
Figure 3:
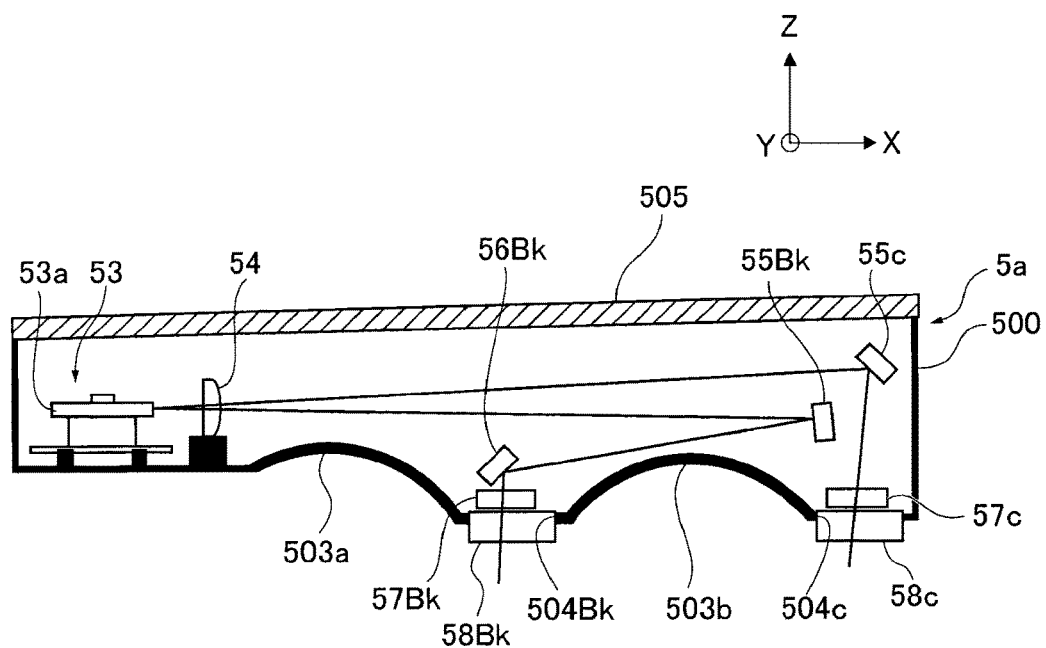
FIG. 3 is a cross section view of the first writing device in FIG. 2.
Figure 4:
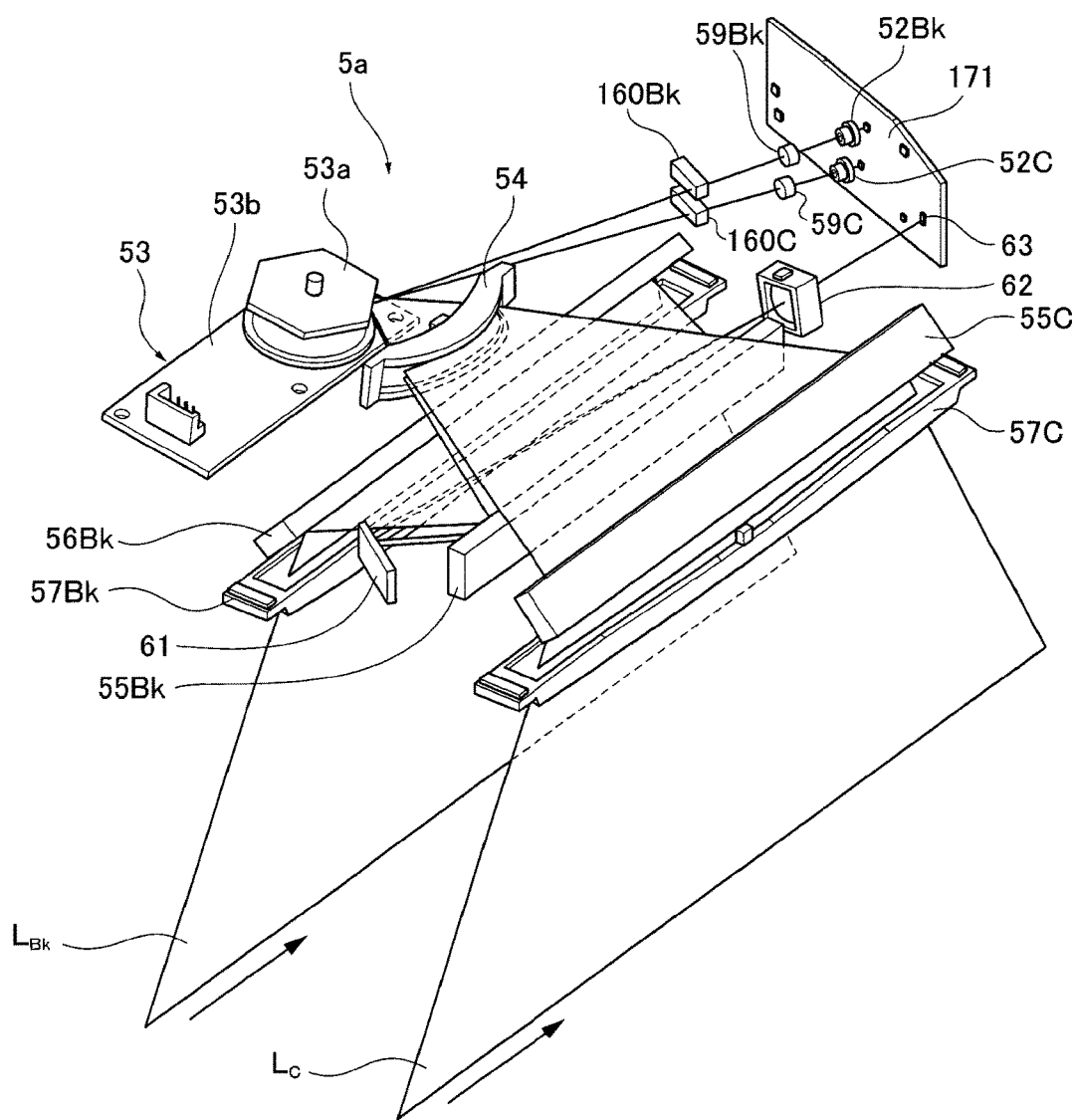
FIG. 4 is a perspective view of optical components accommodated in an optical housing of the first writing device.

The first and second writing devices 5a, 5b are structured same so that only the first writing device 5a is described below. FIG. 2 is a perspective view of the periphery of the first writing device 5a, FIG. 3 is a cross section side view of the same, and FIG. 4 is a perspective view of optical elements of the first writing device 5a accommodated in an optical housing 500. The first writing device 5a emits a light beam L to the black photoconductor 41Bk and cyan photoconductor 41C. The first writing device 5a comprises an LD unit 51, a polygon scanner 53, a scanning lens 54 as an fθ lens, reflective mirrors 55C, 55Bk, 56Bk, long lenses 57Bk, 57C, a synchronous mirror 61, and a synchronous lens 62 accommodated in the optical housing 500, as shown in FIG. 2 to FIG. 4. The optical housing is box-shaped with an open top and a top face is covered with a cover 505 to prevent dust entering inside the optical scanner. The LD unit 51 and the polygon scanner 53 are placed at one end of the optical housing 500. The optical housing 500 is made from thermoplastic resin including glass fibers.

Figure 5:
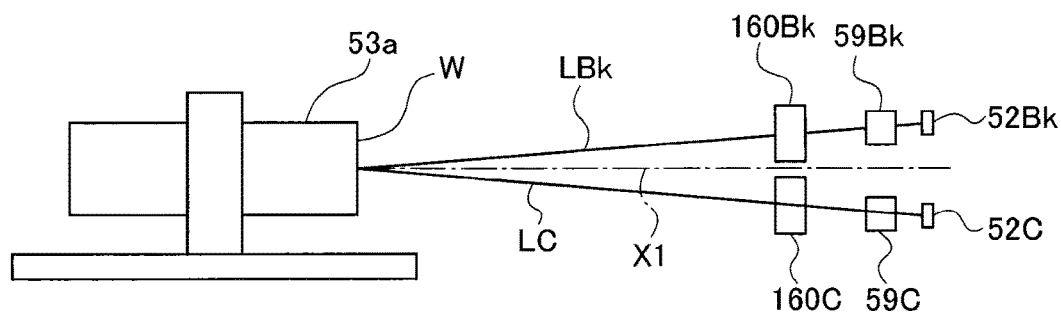
FIG. 5 shows an incidence angle of light on a polygon mirror in a sub-scanning directional cross section.

The LD unit 51 comprises light sources 52Bk, 52C including semiconductor lasers to emit light beams LBk, LC to the photoconductors 41Bk, 41C, respectively and a substrate 171 on which the light sources 52Bk, 52C are secured. The light sources 52Bk, 52C are mounted on the substrate 171 to illuminate the same position of a polygon mirror 53a, as shown in FIG. 5. That is, the light beams LBk and LC from the light sources 52Bk, 52C are incident obliquely onto a reflective mirror W of the polygon mirror 53a relative to a normal line X1. This can reduce the number of polygon mirrors to one and decrease the height (length in the sub scanning direction) of the polygon mirror, resulting in downsizing the optical scanner and lowering the price thereof.

In FIG. 4 a synchronous detector 63 comprising a photo IC is mounted on the substrate 171. The LD unit 51 holds a black collimator lens 59Bk, a cyan collimator lens 59C, a black cylindrical lens 160Bk, and a cyan cylindrical lens 160C.

The polygon scanner 53 comprises the polygon mirror 53a of a regular polygon column, a not-shown motor, and a circuit board 53b on which electric elements for controlling the motor are mounted. The polygon scanner 53 is fastened on an end of the bottom of the optical housing 500 with screws. The polygon mirror 53a includes six reflective mirrors on side surfaces to deflect light. In the present embodiment the polygon mirror 53a is a regular hexagonal column and includes six reflective mirrors but it should not be limited thereto.

The divergent light beam LBk from the light source 52Bk is converted into a parallel light beam by the collimator lens 59Bk on an optical path between the LD unit 51 and the polygon scanner 53. Then, it transmits through the cylindrical lens 160Bk to be collected in the sub scanning direction (corresponding to scanning direction on the photoconductor) and incident on the polygon mirror 53a. The light beam LBk is deflected by the reflective mirrors of the polygon mirror at a constant angular velocity to the main scanning direction corresponding to an axial line of the photoconductor. Then, transmitting through the scanning lens 14, the moving velocity of the light beam is adjusted to a constant velocity. The light beam is returned by the synchronous mirror 61, collected by the synchronous lens 62, and incident on the synchronous detector 63.

Upon detecting the light beam LBk, the synchronous detector 63 outputs a synchronous signal. In accordance with the synchronous signal, the light beam LBk based on black image data is emitted from the light source 52Bk and transmits through the collimator lens 59Bk, cylindrical lens 160Bk, polygon mirror 53a, and scanning lens 54 in order. The light beam then travels through the first and second reflective mirrors 55Bk, 56Bk, and a face tangle error of the polygon mirror is corrected by the long lens 57Bk. The light beam LBk scans the photoconductor 41Bk via a dust-proof glass 58Bk covering an opening in the bottom of the optical housing 500.

Likewise, in accordance with the synchronous signal, the light beam LC based on cyan image data is emitted from the light source 52C, transmits through the collimator lens 59C and cylindrical lens 160C and is incident on the same position of the polygon mirror 53a as the light beam Bk. It is deflected by the reflective mirrors of the polygon mirror 53a in the main scanning direction, and transmits through the scanning lens 54, first reflective mirror 55C, and long lens 57C, and dust-proof glass 58C to scan the surface of the photoconductor 41C. In place of the single scanning lens 54, two scanning lenses for black and cyan can be used. Also, another synchronous detector for the light beam LC can be additionally provided.

Figure 6:
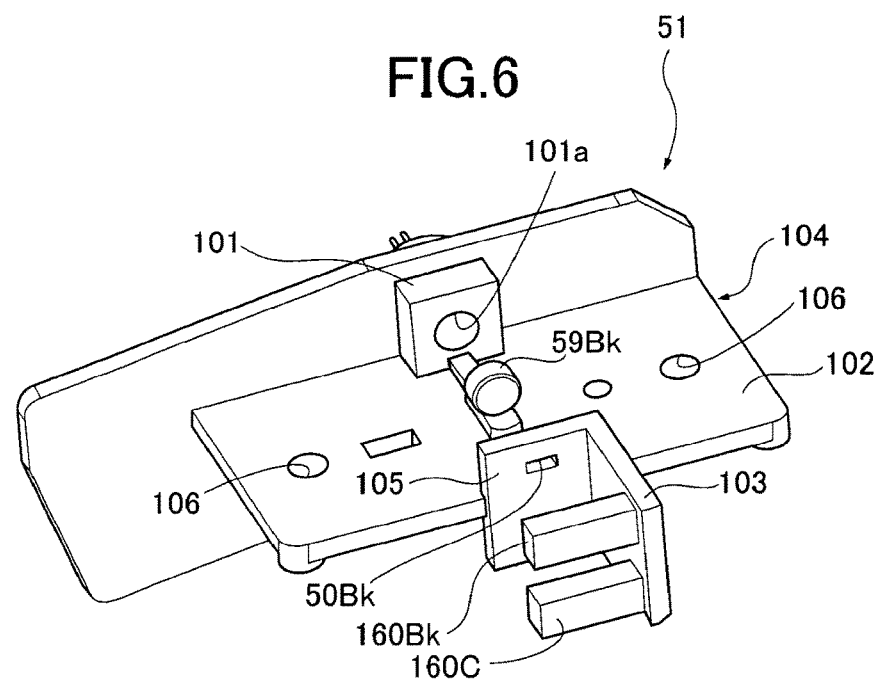
FIG. 6 is a perspective view of an LD unit.

Next, the LD unit 51 is described in detail. FIG. 6 is a perspective view of the LD unit 51. The LD unit 51 includes a holder 104 made from resin to hold the light sources 52Bk, 52C, collimator lenses 59Bk, 59C, and cylindrical lenses 160Bk, 160C. The holder 104 comprises a first mount 101 as a plate on which the light sources 52Bk, 52C are arranged in the sub scanning direction, a second mount 102 as a plate on which the collimator lenses 59Bk, 59C are placed, vertical to the sub scanning direction, and a third mount 103 as a plate on which the cylindrical lenses 160Bk, 160C are placed, vertical to the opening of the optical housing 500.

The first mount 101 has a first hole 101a and a not-shown second hole provided in the sub scanning direction. The light source 52Bk is pressed into the first hole 101a and the light source 52C is pressed into the second hole to secure them. Alternatively, the light sources 52Bk, 52C can be secured on the first mount 101 by means of a blade spring, for example.

The second mount 102 is provided to partition between the first and second holes. The collimator lens 59Bk is adhered onto one side of the second mount 102 facing the opening of the optical housing 500. The collimator lens 59C is adhered on the other side of the second mount 102 facing the bottom of the optical housing 500. Alternatively, an intermediate element to hold the collimator lenses 59Bk, 59C can be provided and adhered on the second mount 102. Moreover, the second mount 102 includes through holes 106 into which screws are inserted at both ends in the main scanning direction.

A wall 105 is provided at the center of the second mount 102 in the main scanning direction and downstream of a light traveling direction and includes a black aperture 50Bk and a not-shown cyan aperture.

The third mount 103 extends in the light traveling direction from one end of the wall 105. One ends of the cylindrical lenses 160Bk, 160C are adhered in series on the third mount 103 in the sub scanning direction.

In the present embodiment the cylindrical lenses 160Bk, 160C are attached to the third mount 103 after the holder 104 is secured in the optical housing 500. For this purpose, the third mount 103 is formed as a plate vertical to the opening of the optical housing 500. Thereby, the cylindrical lenses 160Bk, 160C can be easily attached to the third mount 103 after the holder 104 is secured in the optical housing 500.

Next, the mounting of the LD unit 51 in the optical housing 500 is described. First, the light sources 52Bk, 52C are pressed into the holes of the first mount 101. The positions of the collimator lenses 59Bk, 59C are adjusted with a jig using a general-purpose optical sensor or optical beam scanner, to make the light beams from the light sources 52Bk, 52C be approximately parallel light beams. Thereafter, the collimator lenses 59Bk, 59C are adhered onto the second mount 102. Next, the holder 104 on which the light sources 52Bk, 52C and the collimator lenses 59Bk, 59C are mounted is fastened in the optical housing 500 with the screws, that is, by inserting the screws into the through holes 106 and not-shown holes of the optical housing 500.

Thereafter, the cylindrical lenses 160Bk, 160C are attached on the third mount 103. When fastening the holder 104 in the optical housing 500, the second mount 102 may be bent in the sub scanning direction towards the bottom of the optical housing 500, tilting the first mount 101 relative to the sub scanning direction. As a result, the paths of the light beams from the light sources 52Bk, 52C may be tilted in the sub scanning direction. In the present embodiment the cylindrical lenses 160Bk, 160C are attached after the holder 104 is fastened in the optical housing 500. Thereby, it is possible to correct the tilt of the optical paths and illuminate a predetermined position of the polygon mirror 53a with the light beams from the light sources.

First, the cylindrical lens 160C is attached on the third mount 103. Specifically, the cylindrical lens 160C is held in a not-shown chuck and adjusted in and around the sub scanning and main scanning directions and in and around the optical axis. Then, a general-purpose optical beam scanner or a CCD camera is positioned on the image plane of the photoconductor 41C and the light source 52C emits the light beam to the polygon mirror 53a in rotation. The chuck is moved to measure a beam diameter, the position of the image plane and the like and adjust the position of the cylindrical lens 160C to illuminate a predetermined position of the image plane with a certain beam diameter. The cylindrical lenses 160 are optical elements to collect light in the sub scanning direction. Therefore, the tilt of the light beams in the sub scanning direction can be corrected by changing the posture of the cylindrical lenses 160 around the main scanning direction. Thereby, the light beams can illuminate the predetermined positions of the photoconductors 41. Next, the cylindrical lens 160C is adhered on the third mount 103 by filling an ultraviolet curable adhesive therebetween and emitting ultraviolet light to the adhesive. Alternatively, the positional adjustment of the cylindrical lens 160C can be conducted after the adhesive is filled. Then, the cylindrical lens 160Bk is adhered on the third mount 103 in the same manner as above.

Thus, according to the present embodiment the cylindrical lenses 160Bk, 160C are attached on the third mount 103 after the holder 104 is secured in the optical housing 500. Thereby, even with a tilt of the optical paths of the light sources 52Bk, 52C in the sub scanning direction, the light beams can be emitted to the predetermined position of the polygon mirror 53a. Moreover, the third mount 103 stands vertically to the opening of the optical housing 500 so that the third mount 103 can be handled from the opening after the holder 104 is secured in the optical housing 500. Accordingly, the posture-adjusted cylindrical lenses 160Bk, 160C can be attached on the holder 104 fixed in the optical housing 500.

Alternatively, the cylindrical lenses 160 can be attached on the holder 104 in advance with use of a posture-adjusting mechanism, and then the holder 104 is fastened in the optical housing 100. The tilt of the light beams in the sub scanning direction can be corrected by adjusting the postures of the cylindrical lenses 160 with the posture-adjusting mechanism. However, in the present embodiment a distance from the light sources 52 to the polygon mirror 53a is set to be short for the purpose of downsizing the writing device, as shown in FIG. 2. Because of this, the posture-adjusting mechanism will interfere with the scanning lens 54. Thus, the posture-adjusting mechanism hinders fulfilment of this purpose. According to the present embodiment, without the posture-adjusting mechanism, it is able to reduce the size and costs of the optical scanner by a reduction in the number of elements.

Further, the holder 104 is fixed with screws. Therefore, the LD unit 51 can be easily removed from the optical housing for replacement by merely removing the screws when the light source 52Bk or 52C has gone out. The replacement of the LD unit 51 can be facilitated. Moreover, compared with the use of a blade spring to bias the holder 104 to in-between the optical housing 500 and the blade spring, the holder 104 can be prevented from vibrating. As a result, it is able to avoid generation of defective images such as banding.

Furthermore, in the present embodiment the third mount 103 is a wall extending in the sub scanning direction. Because of this, for posture and position adjustment, the cylindrical lenses 160Bk, 160C held in the chuck can be handled from the sub scanning direction. The writing device scanning in the main scanning direction includes various elements in the main scanning direction but a few in the sub scanning direction in general. In the present embodiment the opening of the optical housing 500 is in the in the sub scanning direction no elements are arranged. Accordingly, it is able to adjust the postures and positions of the cylindrical lenses 160Bk, 160C with no hindrance from the other elements of the writing device.

Figure 7:
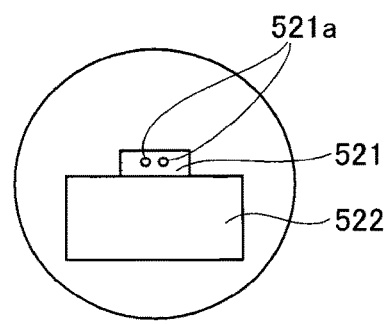
FIG. 7 is an enlarged view of a periphery of a light emitting chip of a light source.

FIG. 7 is an enlarged view of the periphery of a light emitting chip 521 of each of the light sources 52. The light sources 52 are semiconductor lasers each comprising the light emitting chip 521 with a plurality of light emitting points and a heatsink 522.

By use of the light sources with multiple light emitting points, the photoconductor surfaces are scanned with a multibeam. This can achieve high-speed operation of an image forming device without increasing the rotation speed of the polygon scanner. Thus, a thermal increase in the polygon scanner and an oscillation failure due to an increased rotation speed of the polygon scanner can be suppressed, making it possible to heighten the operation speed of the image forming device.

With use of a multibeam, it is necessary to adjust a sub-scan beam pitch. In related art for adjusting a sub-scan beam pitch, the light sources are turned on with a dedicated device to emit two light beams. The exit positions of the light beams are detected to check whether or not the sub-san beam pitch is a predefined beam pitch. If not, the light sources are rotated and turned on with the dedicated device again to check again. By repeating this operation, the sub-scan beam pitch is adjusted to the predefined beam pitch. Thus, the sub-scan beam pitch adjustment requires an expensive device to detect the two light beams and performing the above checking operation. It also takes a large amount of time for the adjustment.

The sub-scan beam pith is varied depending on the posture and form of the scanning lens 54. However, it is most affected by an angle between the direction in which the light emitting points 521a are arranged and the sub scanning direction. By setting this angle to a desired value, the sub-scan beam pitch can be set as aimed. That is, it is possible to easily adjust the sub-scan beam pitch without a dedicated device for measuring the beam pitch and turning on the light sources.

In view of this, the present embodiment provides a structure that beam pitch adjustment is feasible without an expensive dedicated device and can shorten time taken for the adjustment. Such a structure is described referring to FIGS. 8, 9.

Figure 8:
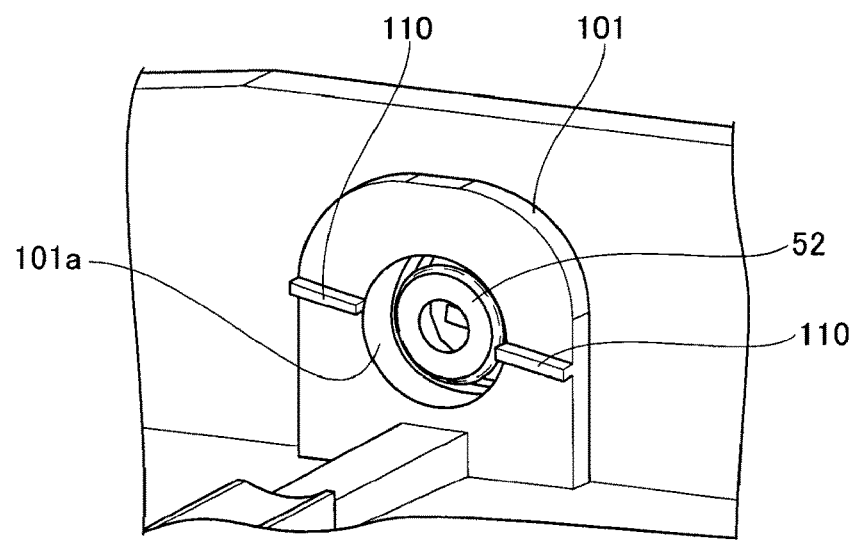
FIG. 8 is a perspective view of a mount for the LD unit as seen from an exit side.
Figure 9:
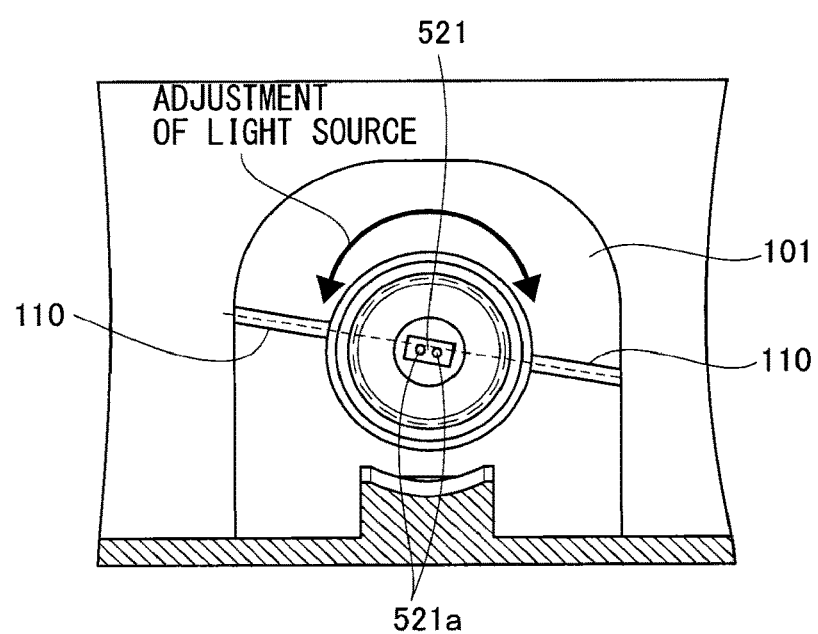
FIG. 9 is a front view of the mount as seen from the exit side.

FIG. 8 is a perspective view of the first mount 101 of the LD unit 51, as seen from the exit side of the light beam. FIG. 9 is a front view of the same. As shown in the drawings, reference marks 110 are ribs formed on the first mount 101, placing the hole 101a between them. Referring to FIG. 9, with the light sources 52 positioned with the predefined beam pitch, the reference marks 110 are formed on an extension of a line connecting the light emitting points 521a, extending in parallel to the alignment of the light emitting points 521a indicated by the broken line.

According to the present embodiment the sub-scan beam pitch is adjusted in the following manner. The light source 52Bk is inserted into the hole 101a and rotated around the optical axis while the positions of the light emitting chip 521 and the reference marks 110 are observed from the exit side with a microscope. The alignment of the light emitting points can be checked from the rectangular shape of the light emitting chip 521. The light emitting chip 521 is rectangular as seen from the exit side and the long sides thereof is parallel to the aligned light emitting points 521a. As shown in FIG. 9, the light source is rotated until the long sides of the light emitting chip 521 become parallel to the two reference marks 110 and the short sides become orthogonal to the reference marks 110. Thereby, the light emitting points 521a are aligned in a predefined direction and the sub-scan beam pitch is adjusted to the predefined pitch, completing the adjustment work. Then, the light source 52 is pressed into the hole 101a and fixed.

In the present embodiment an optical instrument as a microscope is necessary for the beam pitch adjustment. However, it does not require a device turning on the light sources and a device detecting the positions of the two light beams to measure a beam pitch which are higher in price than a microscope. Thus, the sub-scan beam pitch can be adjusted at lower costs. Also, the sub-scan beam pitch can be adjusted by merely rotating the light sources 52 around the optical axis while observing the positions of the light emitting chips 521 and the reference marks 110 with a microscope. Accordingly, it is able to shorten the time taken for the adjustment from that in related art in which the light sources have to be turned on many times to measure the sub-scan beam pitch. Thus, a high-quality writing device can be provided at a lower cost.

Further, the reference marks 110 are ribs which are highly visible, so that more accurate adjustment is enabled.

Furthermore, the light sources 52 are mounted in the LD unit 51 which is detachable from the optical housing 500. Thus, the LD unit 51 is smaller in size and more easily handled than the optical housing. The sub-scan beam pitch can be easily adjusted by rotating the light sources attached to the LD unit 51, compared with the light sources directly attached to the optical housing.

The features of the present embodiment are now described. In the present embodiment the cylindrical lenses 160Bk, 160C are cantilevered on the third mount 103, as described referring to FIG. 6. The reasons for this structure are as follows. In printing images, the polygon scanner emits heat because of the high-speed rotation of the polygon mirror 53a, which thermally expands and bends the optical housing 500. The second mount 102 of the LD unit 51 secured in the optical housing 500 is affected accordingly. As a result, the second mount 102 is warped in a concave or convex form, tilting the third mount 103 as indicated by the solid line in FIG. 10. Also, the heat emission from the polygon scanner may affect the LD unit 51 to be thermally expanded, tilting the third mount 103. Thus, the postures of the cylindrical lenses 160Bk, 160C on the third mount 103 are changed as indicated by the solid line in FIG. 10. That is, the light incidence positions on the cylindrical lens 160Bk, 160C are shifted in the sub scanning direction from before the postural change.

Further, the cantilevered cylindrical lenses 160Bk, 160C are susceptible to vibration and likely to be affected by vibration from the polygon scanner or outside and vibrate. Because of the vibrations of the cylindrical lenses 160Bk, 160C, incidence positions of light on the lenses are also shifted in the sub scanning direction.

Since the cylindrical lenses 160Bk, 160C have optical power in the sub scanning direction, light exit positions are shifted in the sub scanning direction along with the changes in the light incidence positions.

When attaching the substrate 117 on which the synchronous detector 63 is mounted to the holder 104, the substrate 171 may slew or tilt in the sub scanning direction due to a manufacturing error in the holder 104 or due to an error in the assembly of the substrate 171 and the holder 104. This causes the light receiving surface of the synchronous detector 63 mounted on the substrate 171 to tilt in the sub scanning direction. Moreover, in terms of layout, the light receiving surface of the synchronous detector 63 may not be set in parallel to the sub scanning direction.

FIG. 11A shows light incident on the light receiving surface 63a of the synchronous detector 63 with no tilt in the sub scanning direction and FIG. 11B shows the same with a tilt in the sub scanning direction. With no tilt of the surface 63a in FIG. 11A, the synchronous detector 63 can detect light beams at the same timing even when the light beams are incident on different positions in the sub scanning direction. Thus, it can detect light at the correct timing and start writing at the correct timing even if the light exit positions from the cylindrical lenses 160Bk, 160C are changed due to their postural change.

Meanwhile, with the surface 63a tilted as shown in FIG. 11B, the synchronous detector 63 detects the light beam L2 earlier than the light beam L1 by ΔT. Thus, the timing of detection by the synchronous detector 63 differs depending on the light receiving positions in the sub scan direction. Thus, the synchronous detector 63 cannot detect light at the correct timing when the light exit positions from the cylindrical lenses 160Bk, 160C are changed because of the postural change in the sub scanning direction. Accordingly the writing starts at a timing shifted from the correct timing, resulting in failing to form an image at a desired position of a paper.

Shift amounts of the cylindrical lenses 160Bk, 160C in the sub scanning direction due to the tilt of the third mount 103 are as follows. As shown in FIG. 10, the shift amount ΔZ1 at their ends secured on the third mount 103 is smaller than that ΔZ2 at their free ends. Accordingly, the light incident on the fixed ends of the cylindrical lens 160Bk, 160C is less shifted when it exits than the light incident on the free ends.

Figure 12:
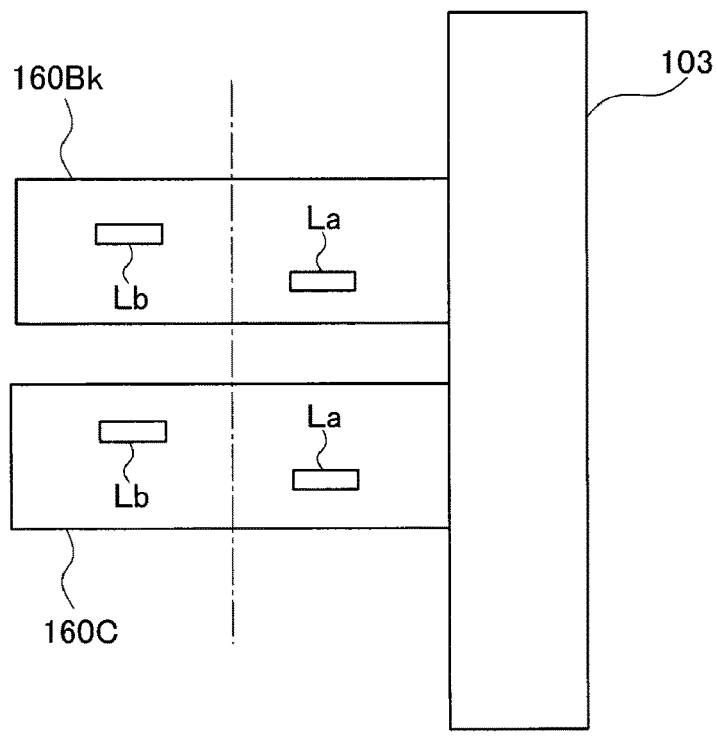
FIG. 12 shows light incident on the cylindrical lens.

In the present embodiment the light sources including the two light emitting points is attached to the substrate with the light emitting points tilted relative to the sub scanning direction, as shown in FIG. 9. Referring to FIG. 12, the light beam La emitted from one of the light emitting points is incident on positions of the cylindrical lenses closer to the fixed ends and the light beams Lb emitted from the other of the light emitting points are incident on positions thereof closer to the free ends relative to the center in the main scanning direction. Therefore, along with a change in the posture of the cylindrical lenses, the shift amount of the light beam La from the one of the light emitting points is smaller than those of the light beams Lb from the other light emitting point when they are exited from the cylindrical lenses.

In view of this, the present embodiment uses the light beam La emitted from the one of the light emitting points for the synchronous detection. Specifically, the light source 52Bk is controlled to emit light only from one of the light emitting points for synchronous detection.

Figure 13:
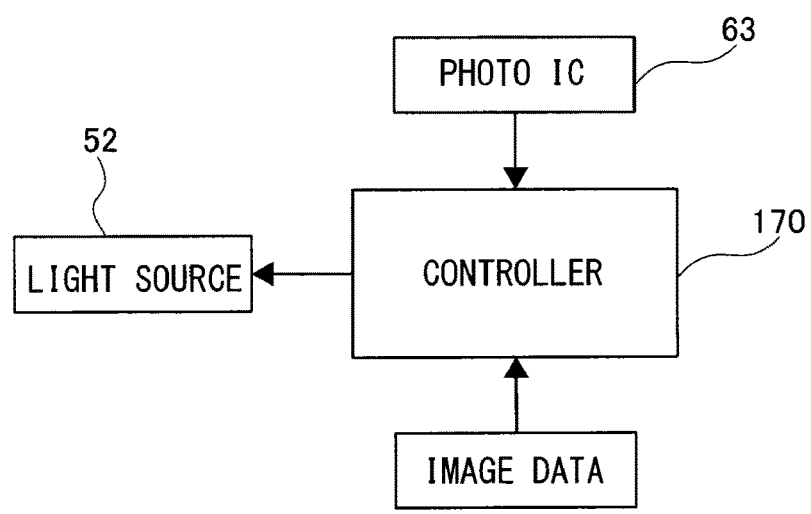
FIG. 13 is a block diagram of elements to control the light source.
Figure 19:
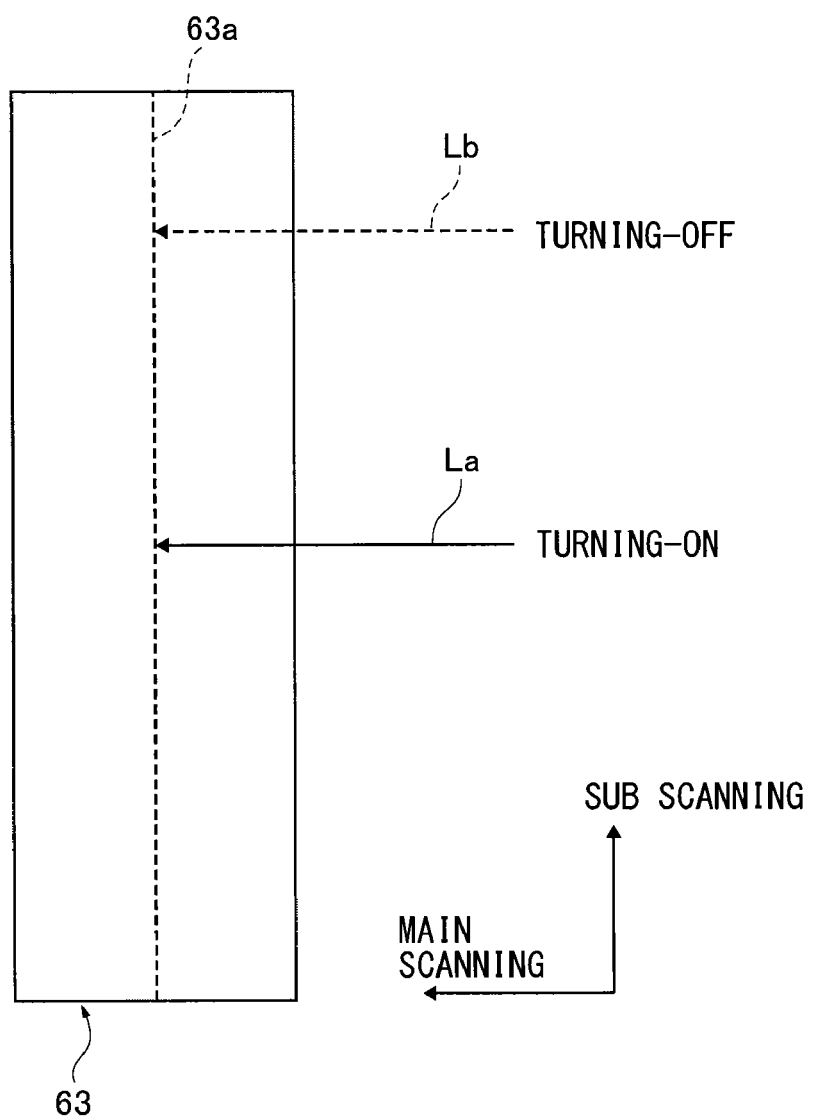
FIG. 19 shows light incident on the synchronous detector for synchronous detection.

FIG. 13 is a block diagram of the basic elements for controlling the light sources. A controller 170 comprises a CPU and an ROM and is mounted on the substrate 171. Prior to writing images on the photoconductors 41, the controller 170 controls the black light source 160Bk to emit the light beam La for synchronous detection from only one of the light emitting points closer to the third mount 103. The light beam La is then incident on the side of the fixed end of the cylindrical lens 160Bk as shown in FIG. 12. Thereby, a shift in the light having passed through the cylindrical lens in the sub scanning direction can be reduced to a minimum. The light beam La is deflected by the polygon mirror 53a and incident on the synchronous detector 63 via the scanning lens 54, first mirror 55Bk, synchronous mirror 61, and synchronous lens 62 (FIG. 19). Even with a tilt of the light-receiving surface of the synchronous detector 63 in the sub scanning direction, a shift in the light for synchronous detection can be minimal. Accordingly, a shift in the detection timing and the output timing of a synchronous signal can be suppressed to a minimum, resulting in reducing a shift in the write start timing to a minimum. Thus, it is made possible to avoid a shift in position of an image arising from the vibration of the cylindrical lenses, the tilt of the third mount 103, and the tilt of the synchronous detector 63.

Furthermore, the other of the light emitting points unused for synchronous detection is turned off, therefore, the synchronous detector 63 never detects the light beams Lb. Thus, the ON time of the other light emitting point is decreased, leading to elongating the life of the light source.

Owing to a minimal shift in the light in the sub scanning direction, a margin of the synchronous detector 63 in the sub scanning direction can be reduced, making it possible to achieve cost reduction and downsize the substrate 171 and the LD unit 51.

Moreover, the cylindrical lens 160Bk is preferably made from glass. The cylindrical lenses are also thermally expanded due to heat from the polygon scanner 53 when printing images. Accordingly, the positions of light incident on and exited from the cylindrical lens 160 in the sub scanning direction are changed. Thus, due to the thermal expansion of the cylindrical lenses, the positions of the light incident on the synchronous detector 63 are changed in the sub scanning direction.

The thermal expansion of the glass cylindrical lens can be reduced from that of a plastic cylindrical lens. Accordingly, it is possible to reduce shifts in the light for synchronous detection in the sub scanning direction, and prevent a shift in the detection timing of the synchronous detector 63 when tilted in the sub scanning direction and a shift in the write start timing.

Further, the glass cylindrical lens 160Bk can be more rigid than a plastic cylindrical lens so that it can be avoided from vibrating, leading to reducing a shift in the exit position of light from the cylindrical lens 160Bk. Accordingly, it is possible to reduce a shift in the light for synchronous detection in the sub scanning direction, and prevent a shift in the detection timing of the synchronous detector 63 when tilted in the sub scanning direction and a shift in the write start timing.

Moreover, the thermal expansion amount is uneven inside the optical housing 500 because of a thermal distribution therein. For example, if the thermal expansion amounts differ between both ends of a location in which the LD unit 51 is secured in the main scanning direction, the entire LD unit 51 is tilted. However, since the third mount 103 is provided in the LD unit 51, the light sources and the third mount 103 are tilted at the same angle and the positional relation between the two is not changed by the tilt of the LD unit 51. Accordingly, even with a tilt of the LD unit 51, light is incident on a predefined position of the cylindrical lens and exited therefrom without a shift in the sub scanning direction. Thereby, it is made possible to reduce shifts in the light for synchronous detection in the sub scanning direction and prevent a shift in the detection timing of the synchronous detector 63 when tilted in the sub scanning direction and a shift in the write start timing.

Figure 14:
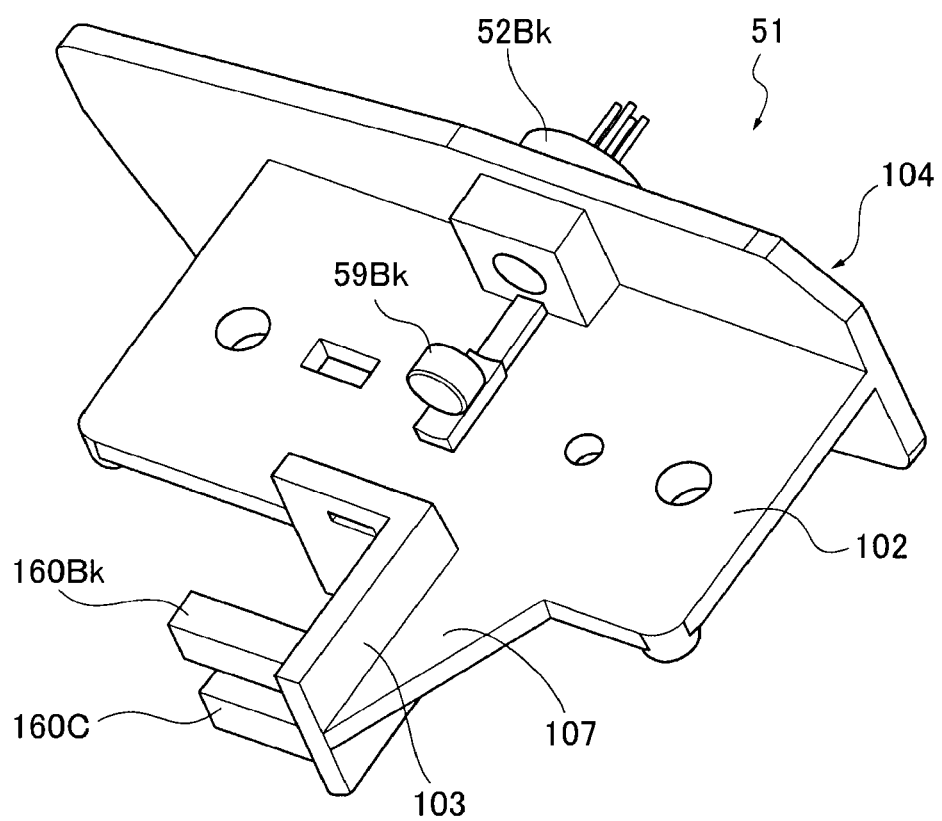
FIG. 14 is a perspective view of the LD unit having a reinforcing rib.

Further, referring to FIG. 14, a reinforcing rib 107 is preferably provided on the surface of the third mount 103 opposite to that on which the cylindrical lenses are attached, for the purpose of enhancing the rigidity of the third mount 103. Thereby, the third mount 103 can be avoided from tilting when the second mount 102 is warped in a concave or convex form due to the thermal expansion of the optical housing 500. Accordingly, the cylindrical lenses attached to the third mount are prevented from changing in posture, preventing the exit light from shifting in the sub scanning direction. It is thus made possible to reduce shifts in the light for synchronous detection in the sub scanning direction and prevent a shift in the detection timing of the synchronous detector 63 when tilted in the sub scanning direction and a shift in the write start timing.

Further, vibrating cylindrical lenses generate a pressing force to the third mount 103. The third mount 103 with an improved rigidity is unlikely to be deformed by the pressing force. As a result, it is possible to decrease the amplitude of the vibration of the cylindrical lenses and reduce a shift in the light exited from the cylindrical lenses in the sub scanning direction. It is thus made possible to prevent a shift in the detection timing of the synchronous detector 63 when tilted in the sub scanning direction and a shift in the write start timing.

Further, a rear-end synchronous detector can be additionally provided to detect a completion of the writing to the photoconductors. It is made possible to correct magnification according to a length of time from the optical detection of the synchronous detector 63 to the optical detection of the rear-end synchronous detector. Preferably, the light emitted from the light emitting point closest to the third mount 103 is set to be incident on the light receiving surface of the rear-end synchronous detector. This can prevent a shift in the detection timing of the rear-end synchronous detector and prevent a decrease in the accuracy at which magnification is corrected.

Further, the synchronous detector 63 can be configured to control the write start timing upon detecting light after completion of the writing in place of detecting light before start of the writing. Note that light before start of the writing refers to light more upstream and light after completion of the writing refers to light more downstream than the light scanning the photoconductors among light deflected by the reflective surfaces of the polygon mirror.

Furthermore, the total four light beams from the two light emitting points of the light source Bk and the two light emitting points of the light source 52C are incident on the surface of the scanning lens 54 at respective different positions in the sub scanning direction. Because of this, the scanning lens is formed long in the sub scanning direction by resin injection molding. Owing to its long length in the sub scanning direction, the scanning lens 54 is thick so that sink marks are likely to occur. Sink marks are more likely to occur and become larger in a portion of the lens 54 further from the center in the sub scanning direction. A large sink mark is easily changed in shape by a thermal expansion of the scanning lens during a thermal increase inside the optical scanner. Accordingly, when incident on an end of the scanning lens including a large sink mark in the sub scanning direction, light is likely to vary in the sub scanning direction by a thermal increase in the optical scanner.

Figure 15:
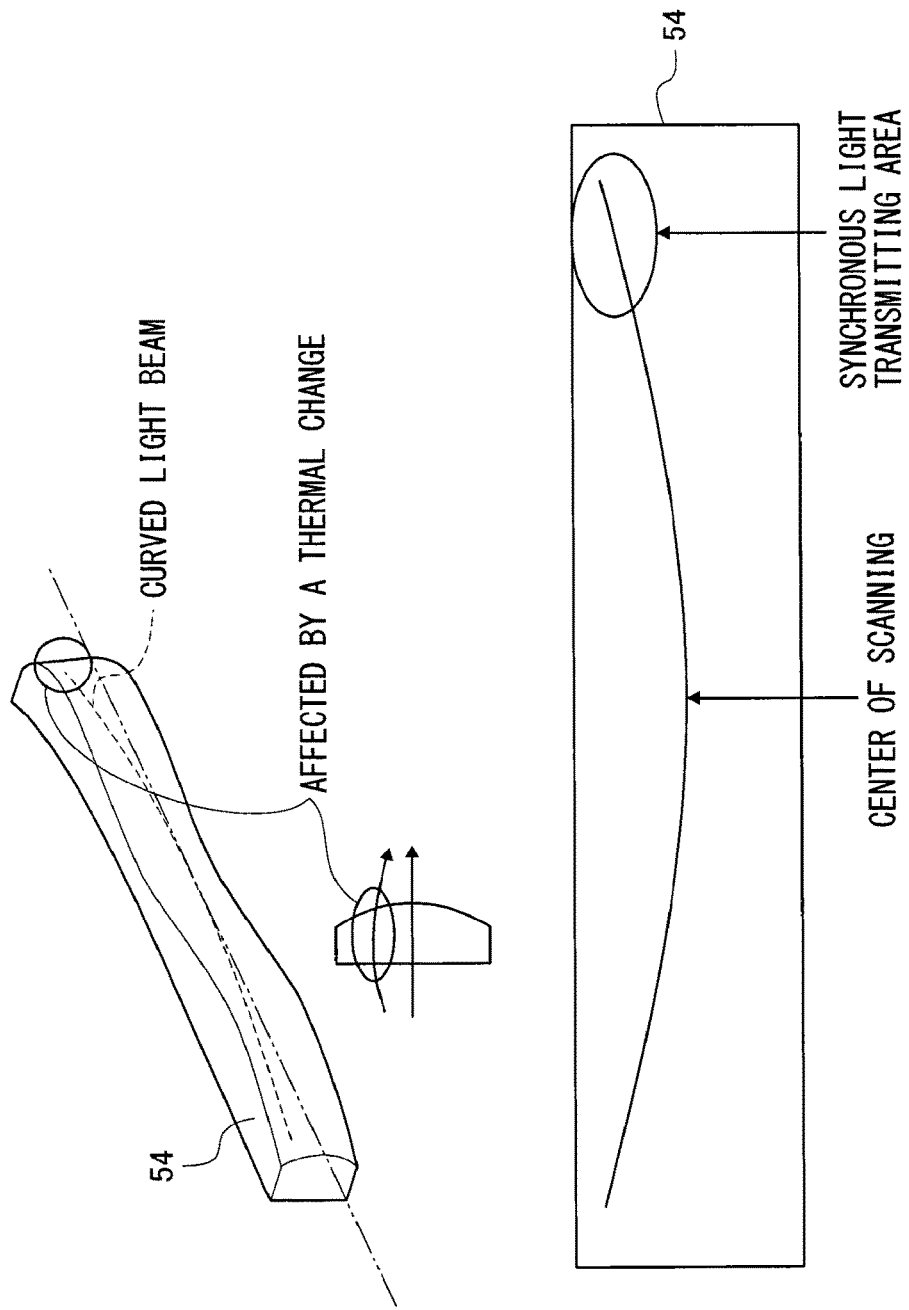
FIG. 15 shows light incident on a scanning lens of a slanting optical system.

In an oblique incidence system where the light beams from different light sources are incident on the same position as shown in FIG. 5, in principle a scanning line deflected by the polygon mirror 53a is curved in the sub scanning direction. The direction of the curve differs or is reversed depending on the direction from which the light is incident. That is, when incident on the scanning lens, both ends of the scanning line are incident on the ends of the scanning lens 54 in the sub scanning direction rather than the center, as shown in FIG. 15. Peripheral light passes off-axis and is easily affected by a change in shape due to a thermal variation. The light having transmitted through the ends of the scanning lens in the main scanning direction, that is, the portion including a large sink mark, is incident on the synchronous detector 63. Accordingly, the light incident on the synchronous detector 63 is likely to shift in the sub scanning direction due to a thermal variation in the optical scanner.

For the above reason, it is preferable to set the light beam La for synchronous detection from the one of the light emitting points to be incident on closer to the central portion of the scanning lens 54 in the sub scanning direction than the light beam Lb, since the light beam La is incident on the side of the fixed end of the cylindrical lens.

Figure 16A:
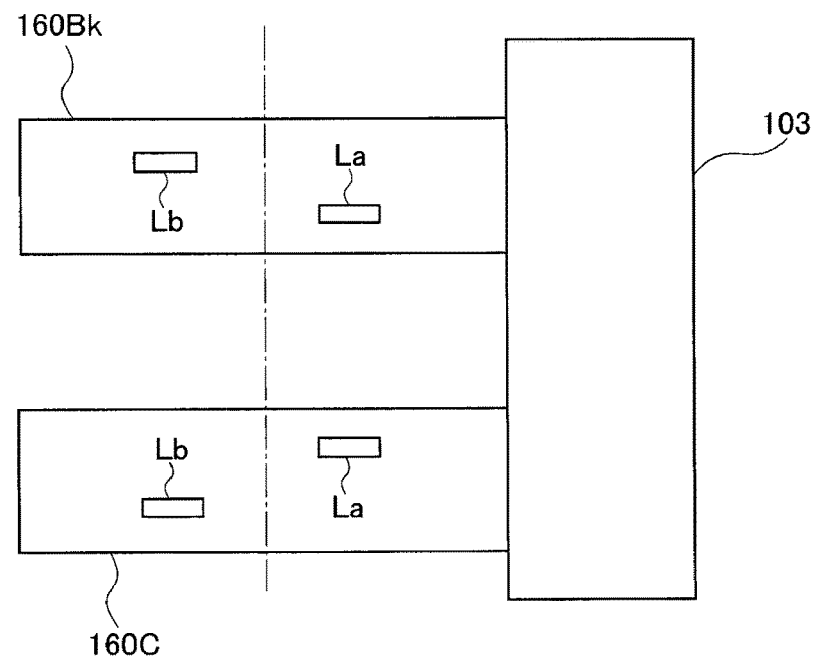
FIGS. 16A, 16B show a structure to allow light to be incident on the central portion of a scanning lens in the sub scanning direction for synchronous detection.

Specifically, referring to FIG. 16A, for black color, the light beam La is set to be incident on a position of the cylindrical lens 160Bk lower than a position where the light beam Lb is incident. Thus, the light source 52Bk is inserted into the first hole 101a such that the one of the light emitting points is positioned below the other light emitting point in the sub scanning direction.

Meanwhile, for cyan color, the light La is set to be incident on a position of the cylindrical lens 160C higher than a position where the light Lb is incident. Thus, the light source 52C is inserted into the first hole 101a such that the one of the light emitting point is positioned above the other light emitting point in the sub scanning direction.

Figure 16B:
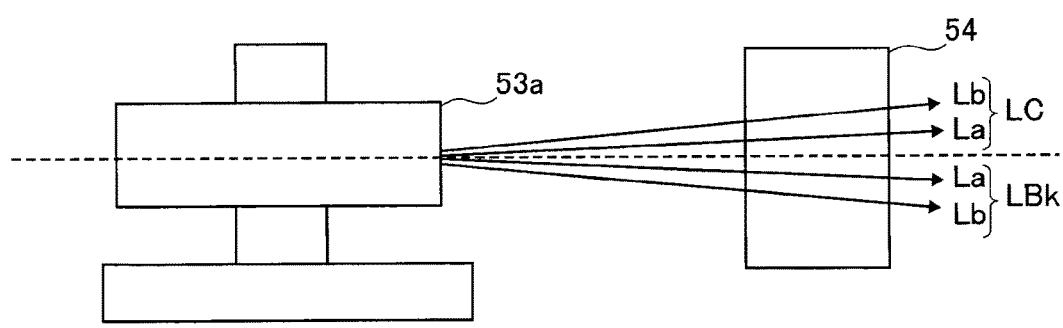
Figure 17:
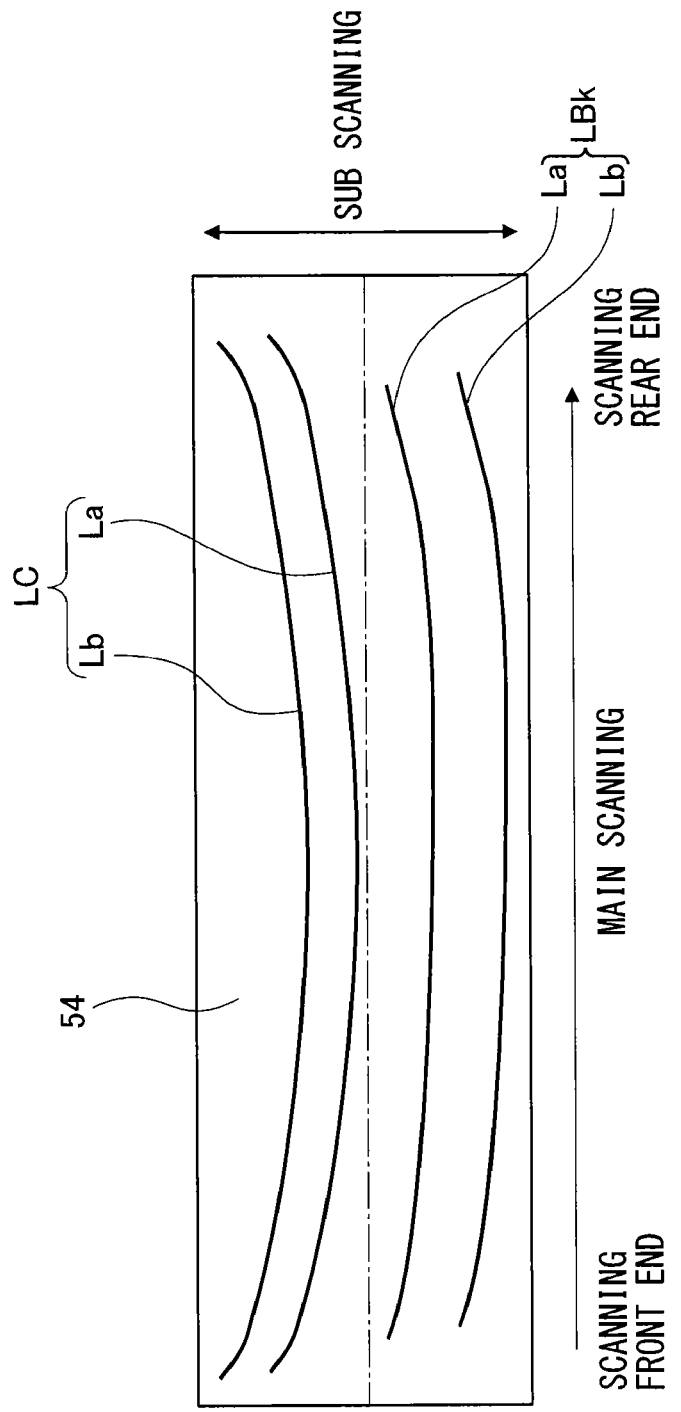
FIG. 17 shows light incident on the scanning lens with the structure in FIGS. 16A, 16B.

This makes it possible to have the light La used for synchronous detection be incident on the vicinity of the center of the scanning lens 54 in the sub scanning direction which is less affected by a sink mark, as shown in FIG. 16B and FIG. 17. The light La for synchronous detection can be unsusceptible to a thermal expansion of the scanning lens due to a thermal increase inside the optical scanner and avoided from shifting in the sub scanning direction. The detection timing of the synchronous detector can be prevented from shifting even when the light receiving surface thereof is tilted in the sub scanning direction.

Figure 18:
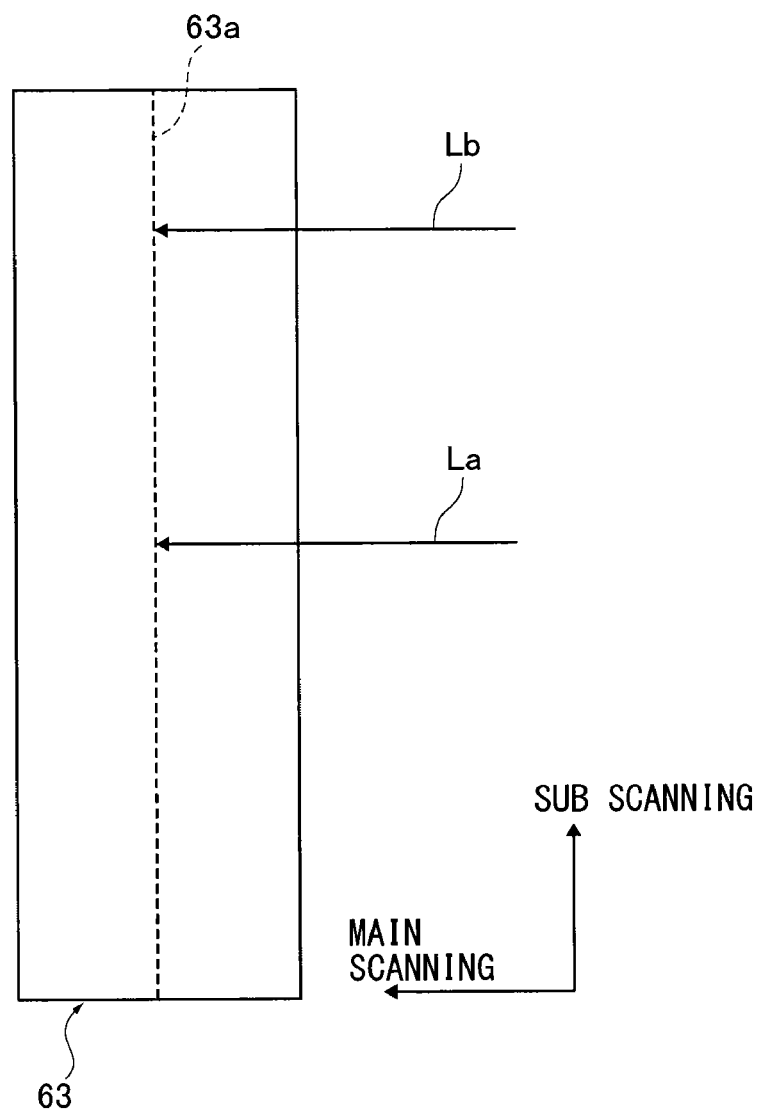
FIG. 18 shows light incident on the central portion of the scanning lens in the sub scanning direction for synchronous detection.

Furthermore, it is preferable that the light La for synchronous detection is set to be incident on the central portion of the synchronous detector 63 in the sub scanning direction, as shown in FIG. 18. Thereby, even when a slight shift in the light La occurs by a thermal change or vibration of the optical scanner, the light La can be surely incident on the light receiving surface of the synchronous detector 63. A failure in the synchronous detection can be prevented accordingly.

Alternatively, the elements can be configured to allow the light La to be incident on the central portion of the synchronous detector 63 in the sub scanning direction, for example, the mount position of the synchronous detector 63 on the substrate 171. Also, the position of the synchronous detector 63 can be adjusted for this purpose by turning on the one of the light emitting elements to receive the light La at the center in the sub scanning direction. The synchronous detector 63 is then fixed after the adjustment. Thus, the light La from the one of the light emitting points can be incident on the central portion of the synchronous detector 63 in the sub scanning direction.

Figure 20:
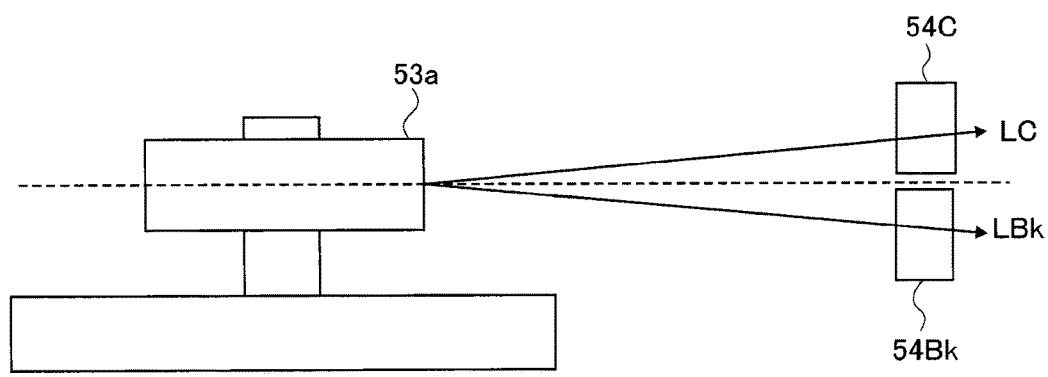
FIG. 20 shows a cyan scanning lens and a black scanning lens provided.
Figure 21:
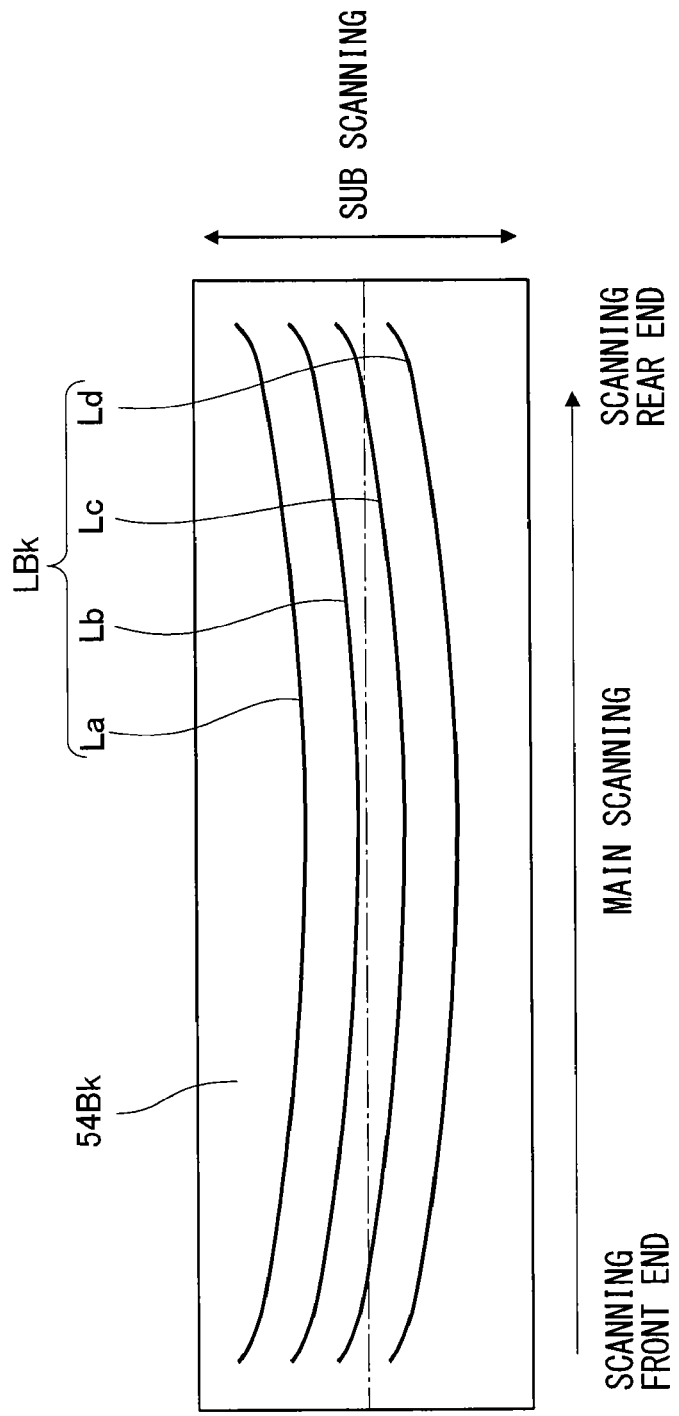
FIG. 21 shows light incident on the black scanning lens.

Moreover, referring to FIGS. 20 and 21, for example, in a case where two scanning lenses 54Bk, 54C are provided and the light source includes four light emitting points to scan the photoconductors with four light beams La, Lb, Lc, Ld, the light beams Lb, Lc passing about the center of the scanning lens 54Bk in the sub scanning direction are used for synchronous detection. Further, with use of the synchronous detector 63 in FIGS. 18, 19 and the cantilevered cylindrical lenses in FIG. 12, preferably, one of the light beams Lb, Lc incident on about the fixed ends thereof is used for the synchronous detection. Moreover, if the light beam is varied in the sub scanning direction more largely by the cantilever support of the cylindrical lenses than the sink mark of the scanning lens, one of the light beams, La, Lb, Lc, Ld most closely incident on the fixed ends is preferably used for the synchronous detection. In this case the scanning lens can be attached in the optical housing so as to have the light most closely incident on the fixed ends of the cylindrical lenses pass through the central portion of the scanning lens in the sub scanning direction.

Figure 22:
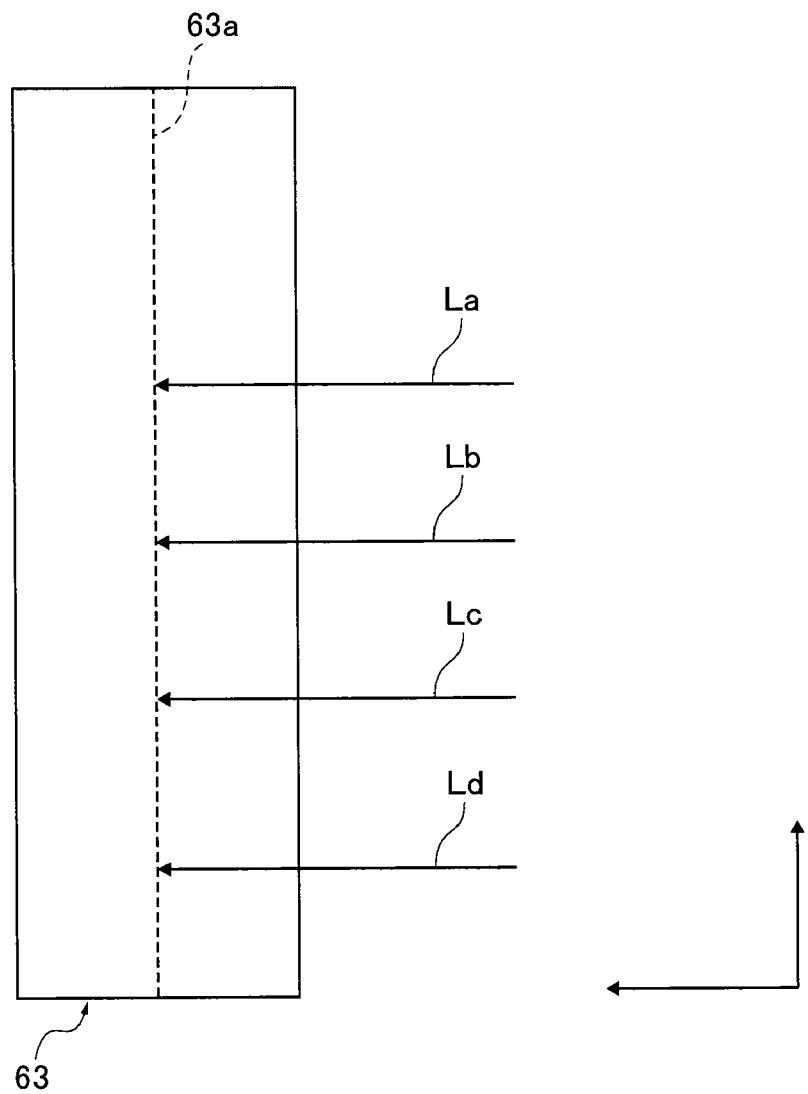
FIG. 22 shows light incident on the central portion of the synchronous detector in the sub scanning direction from the cyan scanning lens and black scanning lens for synchronous detection.

Referring to FIG. 22, it is also preferable to set the light beam Lb to be incident on the central portion of the synchronous detector 63 in the sub scanning direction. Thereby, even when the light Lb for synchronous detection slightly shifts by a thermal change or vibration of the optical scanner, the light Lb can be surely made incident on the light receiving surface 63a of the synchronous detector 63. A failure in the synchronous detection can be prevented accordingly.

Figure 23:
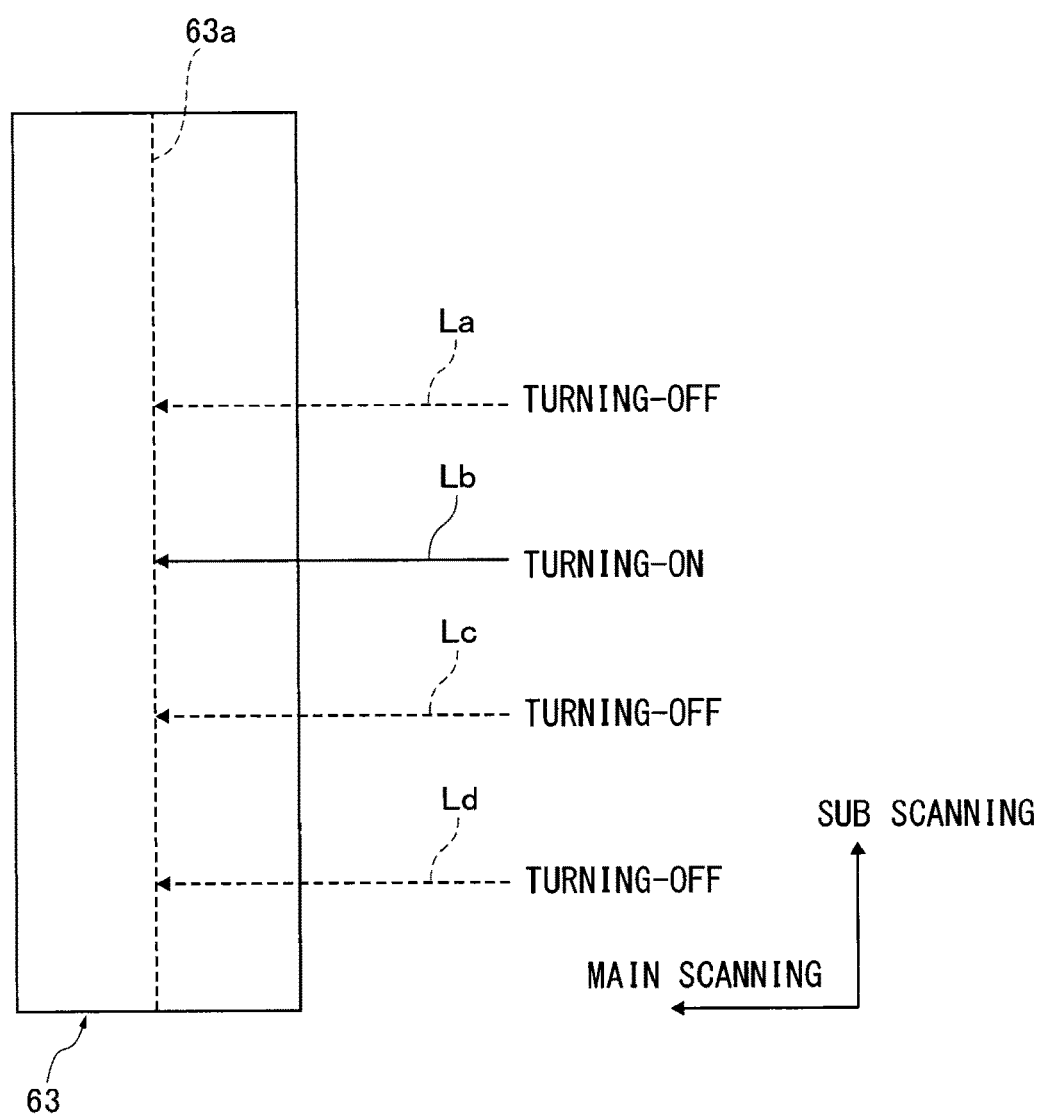
FIG. 23 shows light incident on the central portion of the synchronous detector in the sub scanning direction from the cyan scanning lens and black scanning lens for synchronous detection.

The light emitting point used for synchronous detection alone is turned on to emit the light beam Lb to be incident on the synchronous detector 63, as shown in FIG. 23. The synchronous detector 63 does not detect the other light beams La, Lc, Ld. Further, a length of time for which the other light emitting points are on can be reduced, elongating the life of the light source.

Second Embodiment

Figure 24:
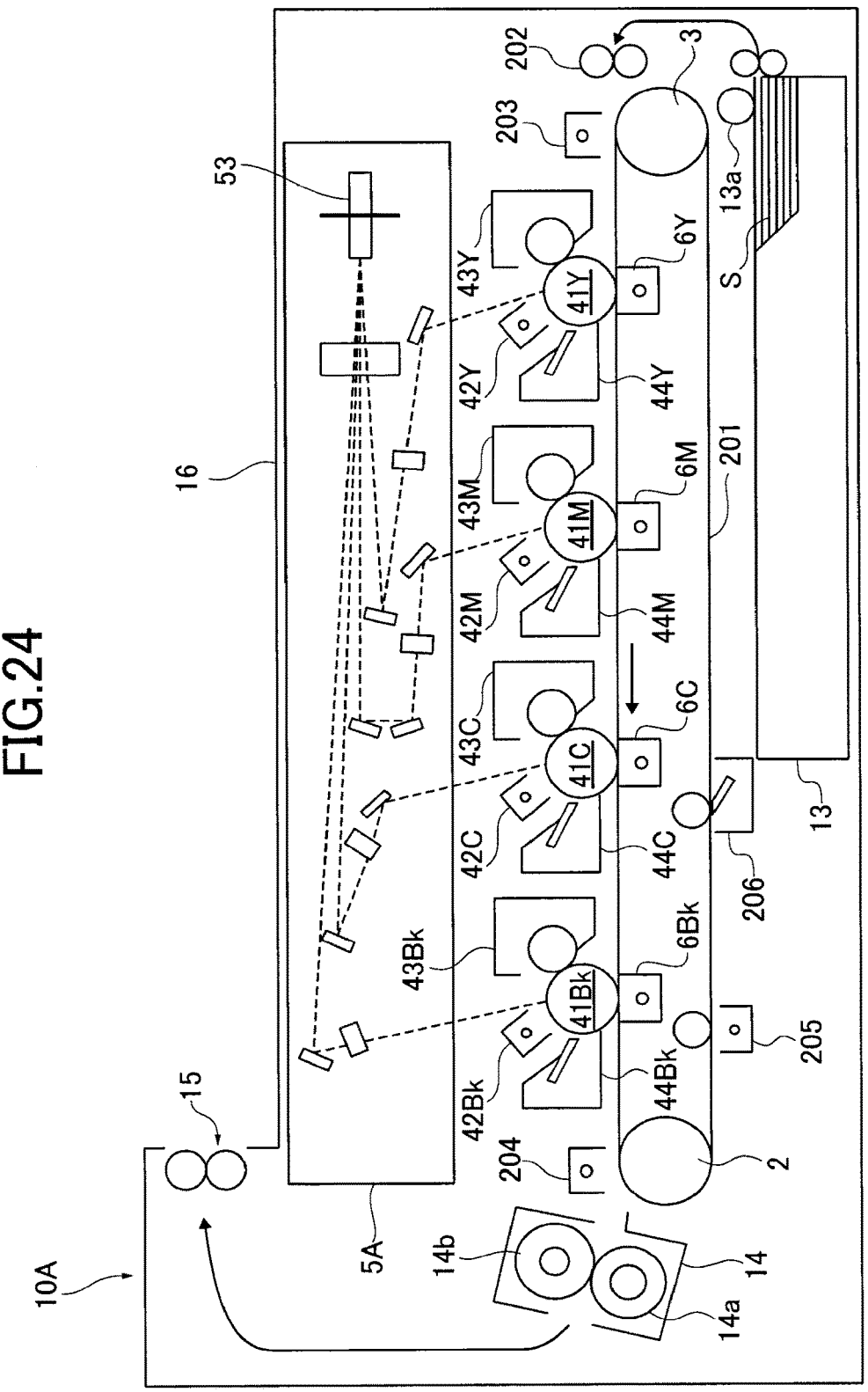
FIG. 24 schematically shows the structure of an image forming device according to a second embodiment.

An image forming device according to a second embodiment is described. FIG. 24 schematically shows the structure of an image forming device 10A according to the second embodiment. In FIG. 24 the image forming device 10A is a tandem full color image forming device directly transferring toner images from the photoconductors 41Y, 41M, 41C, 41Bk onto sheets of paper. In place of the intermediate transfer belt 1, a carrier belt 201 is disposed horizontally on the bottom of the image forming device 10A to carry sheets of paper fed from the paper feeding cassette 13. The photoconductors 41Y, 41M, 41C, 41K are disposed with equal intervals in order from an upstream of a paper carrying direction.

The diameters of the photoconductors 41Y, 41M, 41C, 41Bk are the same and elements to perform respective operations in compliance with electrophotographic process are arranged around the photoconductors. Taking the photoconductor 41Y as an example, the charger 42Y, developing unit 43Y, transfer charger 6Y, and cleaner 44Y are arranged in order around the photoconductor 41Y. This applies to the other photoconductors 41M, 41C, 41Bk.

A registration roller 202 and a charger 203 are provided around the carrier belt 201 more upstream than the photoconductor 41Y. The charger 203 functions to charge sheets of paper to have them absorbed onto the carrier belt 201 by static electricity. Further, a belt separation charger 204, a charge neutralizer 205, and a belt cleaner 206 are provided in order downstream the photoconductor 41Bk in the rotational direction of the carrier belt 201. A fixing unit 14 is provided downstream the belt separation charger 204 in a paper carrying direction, and connected to the paper tray 16 via the paper ejection roller 15.

In full color (four colors) mode, for example, a writing device 5A scans the surfaces of the photoconductors 41Y, 41M, 41C, 41Bk with light beams to form electrostatic latent images on the surfaces in accordance with four color image signals. The electrostatic latent images are developed with the corresponding developing units to toner images and transferred and superimposed on a sheet of paper carried on the carrier belt 201. Thereby, a full color image is formed on the paper sheet, fixed in the fixing unit 14 and ejected onto the paper tray via the paper ejection roller 15.

The writing device 5A of the image forming device 10A comprises four-color (Y, M, C, Bk) optical scan systems to effectively correct a curved scanning line and deterioration in wave aberrations, and secure high quality image reproducibility with no color shifts. In the present embodiment a one-side scanning writing device is adopted. Alternatively, a compound scanning writing device can be used.

Figure 25:
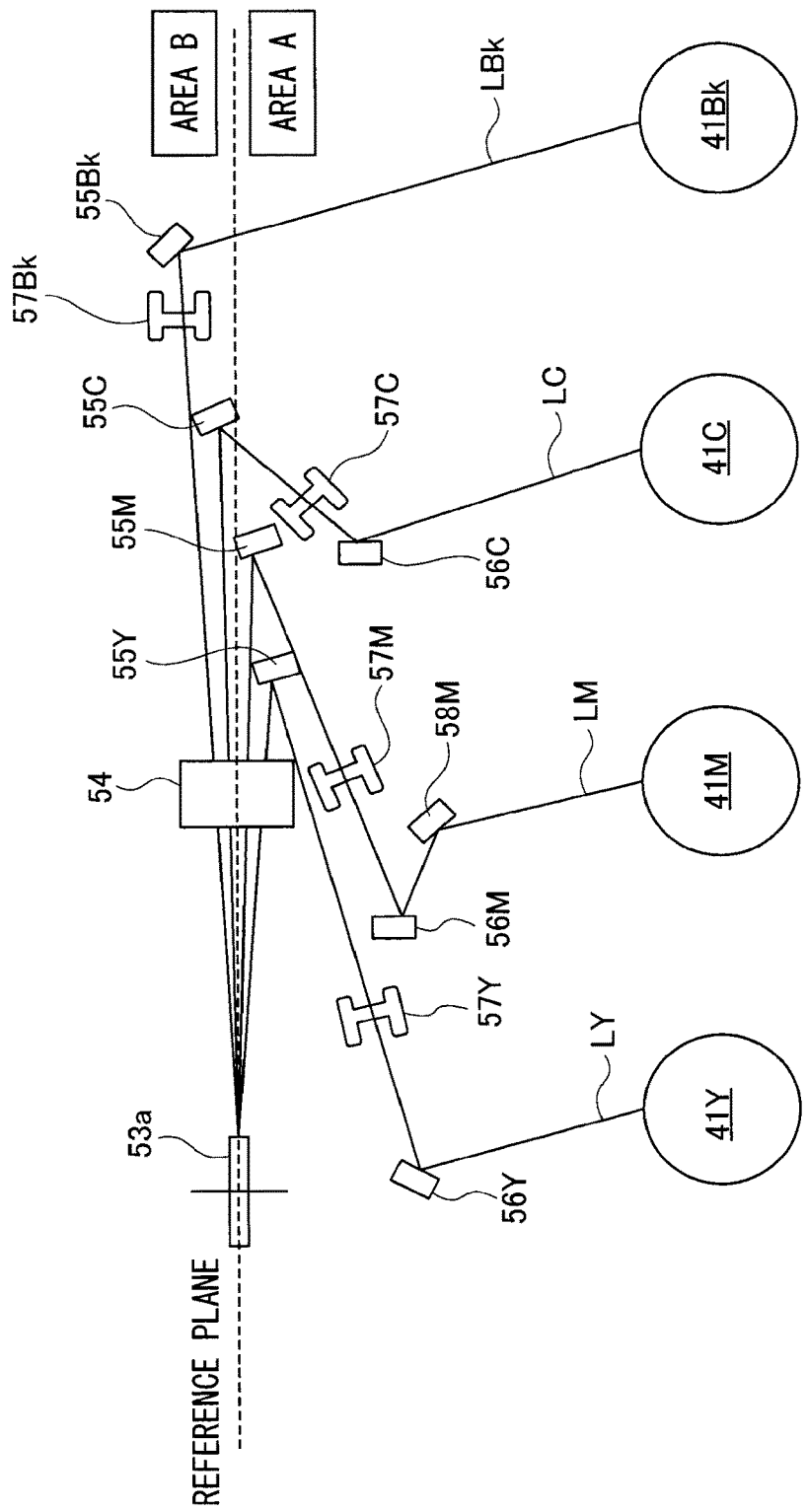
FIG. 25 schematically shows the structure of optical elements of a writing device contained in an optical housing and photoconductors according to the second embodiment.
Figure 26A:
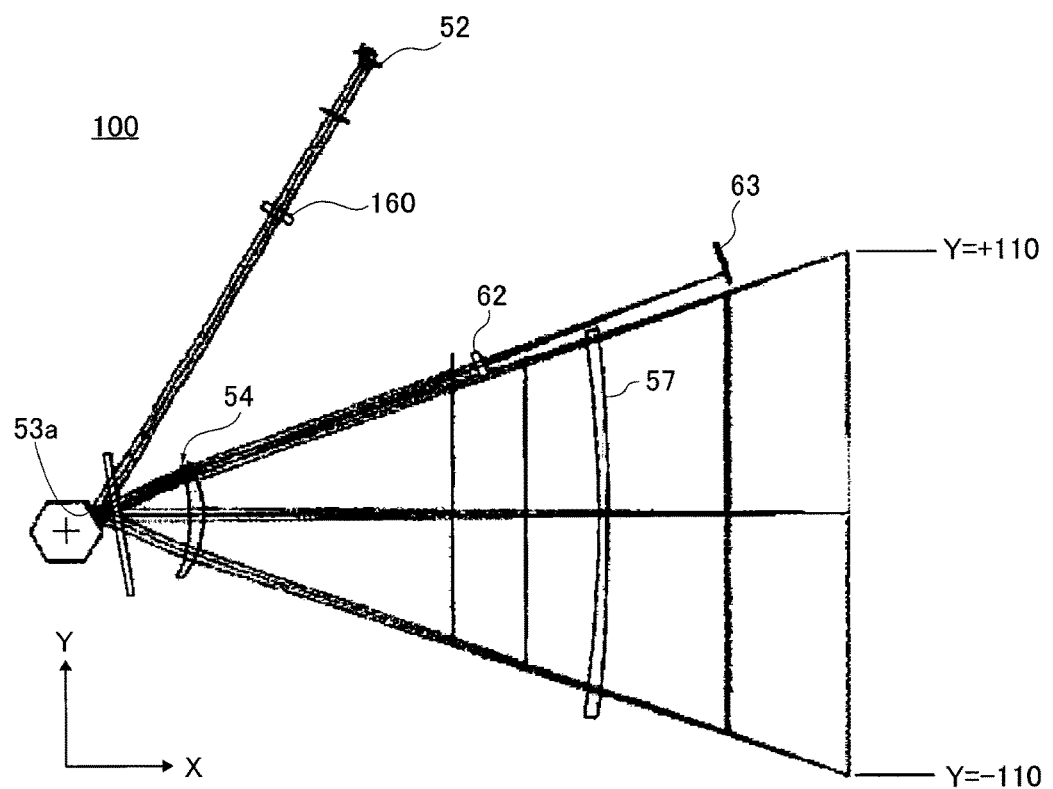
FIGS. 26A, 26B show an optical scan system and an optical synchronous system of the writing device according to the second embodiment.
Figure 26B:
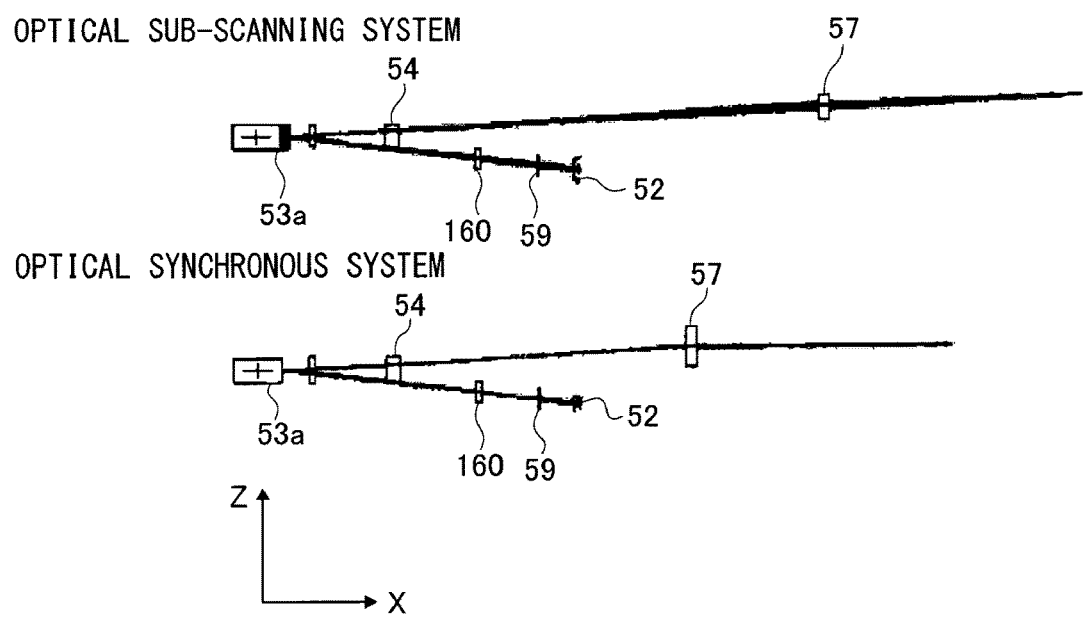

Next, the writing device 5A is described in detail referring to FIGS. 25 and 26A, B. FIG. 25 schematically shows the structure of the optical elements of the writing device 5A contained in the optical housing together with the photoconductors. FIGS. 26A, 26B show an optical scan system and an optical synchronous system of the writing device 5A. Four light beams are obliquely incident on the reflective surfaces of the same polygon mirror 53a and deflected. Two each of the four light beams are symmetrically incident on the polygon mirror 53a relative to the reference axis from two sides (areas A and B in FIG. 25) of the sub scanning direction and symmetrically exited in opposite directions. The four light beams deflected by the polygon mirror 53a transmit through the scanning lens 54, are separated by corresponding returning mirrors 55 to 58, and guided to the photoconductors 41Y, 41M, 41C, 41Bk, respectively. The long lenses 57Y, 57M, 57C, 57Bk are placed for the light beams traveling to the photoconductors 41Y, 41M, 41C, 41Bk. The long lenses 57Y, 57M, 57C, 57Bk are preferably formed to have the same surface shape for the sake of facilitating manufacturing and reducing costs.

Four light beams LY, LM, LC, LBk are incident on the scanning lens 54. The scanning lens 54 is positioned such that the light beams LY and LBk are symmetrically incident on the scanning lens relative to the reference plane indicated by a broken line in FIG. 25 in the sub scanning direction and symmetrically exited from the scanning lens 54. Likewise, the light beams LM and LC are symmetrically incident on the scanning lens relative to the reference plane in the sub scanning direction and symmetrically exited from the scanning lens 54. The reference plane of the scanning lens refers to a plane orthogonal to the rotational axis of the polygon mirror and including the center of the scanning lens in the sub scanning direction.

Moreover, the long lenses 57Y, 57M, 57C, 57Bk are inclined relative to the reference plane in FIG. 25 at an angle equal to a tilt angle of the light beams incident on the long lenses relative to the reference plane.

Next, an optical synchronous system for the light to be incident on the synchronous detector 63 is described. A synchronous light beam is returned by a not-shown returning mirror and separated from an optical scan system to form an image on the synchronous detector 63 with a synchronous lens 62. Preferably, the synchronous light beam is provided for each of the light beams deflected by the optical scan system but a single light beam can synchronize all the light beams from the optical scan system. It is preferable to set, to a negative value, the focal length of the scanning lens 54 in a sub-scanning cross section through which the synchronous light beam transmits. The synchronous lens 62 is an anamorphic lens having different curvatures in the main and sub scanning directions. The effective area thereof in the sub scanning direction is set to be larger than the area of the scanning lens 54 through which the synchronous light beam transmits, for the purpose of preventing the light beam from deviating from the optical synchronous system.

The effects of the above embodiments are as follows.

The writing device 5 as an optical scanner comprises the light source 52 including the light emitting elements, the polygon mirror 53a which deflects light from the light source for scanning the surface of the photoconductors 41, the cylindrical lens 160 as an optical element arranged between the light source 52 and the polygon mirror 53a, having optical power in the sub scanning direction being along a rotational axis of the polygon mirror, the synchronous detector which detects the light deflected by the polygon mirror for synchronous detection and generates a signal for controlling a timing at which the scanning of the surface is started, and the third mount 103 as a fixing element which secures one end of the optical element. The light emitting elements of the light source 52 are aligned with a certain tilt angle relative to the sub scanning direction, and the light from one of the light emitting elements disposed closest to the fixing element in the main scanning direction is used for the synchronous detection, the main scanning direction being orthogonal to the sub scanning direction and the optical axis. When affected by a thermal expansion of the optical housing 500, a posture of the fixing element is tilted to change a posture of the cylindrical lens 160, and a change amount of the position of the optical element in the sub scanning direction is increased as the position is further away from the fixing element. This is because the optical element is cantilevered by the fixing element. Accordingly, the light incident on a portion of the optical element away from the fixing element is largely shifted in the sub scanning direction when exited from the optical element. In view of this, the light of the light emitting element closest to the fixing element is used for synchronous detection. Thereby, it is possible to reduce a shift amount of light incidence positions on the optical element from when the lights from the other light emitting elements are used for synchronous detection. Further, it is possible to reduce a shift in the detection timing when the light receiving surface of the synchronous detector is tilted due to an assembly error or a mounting error. Thus, a write start timing can be prevented from shifting, preventing a shift in the position of an image.

Further, for the synchronous detection, only one of the light emitting elements as the light emitting points 521a closest to the fixing element (third mount 103) in the main scanning direction is turned on. Thereby, it is possible to prevent the light from the other light emitting elements from entering the synchronous detector 63. Only the light from the light emitting element closest to the fixing element in the main scanning direction is incident on the synchronous detector 63.

The optical scanner further comprises the holder 104 to support the light source 52, and the fixing element is provided in the holder. As described in the above embodiments, if the holder 104 for the light source is tilted by thermal expansion of the optical housing 500, the third mount 103 as the fixing element is tilted at the same angle as the light source. This can prevent a change in the light incidence position on the cylindrical lens in the sub scanning direction unlike a structure that the holder and fixing element are separately provided. Accordingly, it is possible to reduce a shift in the detection timing when the light receiving surface of the synchronous detector 63 is tilted in the sub scanning direction.

Further, the reinforcing rib 107 is provided in the third mount 103 as the fixing element. The reinforcing rib 107 can enhance rigidity of the fixing element and prevent the fixing element from tilting by a bending of the second mount 102. Also, it can help decreasing the amplitude of vibration of the optical element as the cylindrical lens 160 cantilevered on the fixing element. This can prevent the optical element from being changed in posture and the light through the optical element from varying in the sub scanning direction. Accordingly, it is possible to reduce a shift in the detection timing when the light receiving surface of the synchronous detector 63 is tilted in the sub scanning direction.

Further, the cylindrical lens 160 as the optical element is made from glass. As described in the above embodiments, the glass cylindrical lens 160 is less likely to thermally expand than that made from plastic. Also, the glass cylindrical lens has larger rigidity so that its vibration is reduced. Thus, the light having passed the optical element is prevented from shifting in the sub scanning direction. Accordingly, it is possible to reduce a shift in the detection timing when the light receiving surface of the synchronous detector 63 is tilted in the sub scanning direction.

Moreover, in the optical scanner the light from the light source 52 is obliquely incident on the deflection surface of the polygon mirror 53a relative to a normal line on the deflection surface in a cross section in the sub scanning direction. This can prevent a shift in the write start timing in the oblique optical incidence system.

Moreover, the optical scanner further comprises the scanning lens 54 as scanning element on which the light deflected by the polygon mirror is incident. The light from one of the light emitting elements closest to the fixing element is set to be incident on the central portion of the scanning lens 54 in the sub scanning direction more than the light beams from the rest of the light emitting elements. In the above embodiments, for black color the light source 52Bk is set so that the light beam La of the light emitting element closest to the fixing element is incident on a lower position of the cylindrical lens 160 than the other light beams. For cyan color the light source 52C is set so that the light beam La is incident on an upper position of the cylindrical lens 160 than the other light beams, as shown in FIG. 16. Thus, the light beam for synchronous detection is set to pass in the vicinity of the center of the scanning lens 54 having a little sink mark. Thereby, even if the scanning lens 54 is thermally expanded due to a thermal increase, the light having passed the scanning lens 54 can be prevented from varying in the sub scanning direction. It is therefore made possible to further reduce a shift in the detection timing when the light receiving surface of the synchronous detector 63 is tilted in the sub scanning direction.

The writing device 5 as an optical scanner comprises the light source 52 including a plurality of light emitting elements, the polygon mirror 63 which deflects light from the light source for scanning the surface of the photoconductor 41, the scanning lens 54 on which the light deflected by the polygon mirror is incident, and the synchronous detector 63 which detects the light beam deflected by the polygon mirror 53 for synchronous detection and generates a signal for controlling a timing at which the scanning of the surface is started, wherein the light emitting elements of the light source 52 are positioned differently from each other in the sub scanning direction along a rotational axis of the polygon mirror, and light other than light incident on a position closest to an end of the scanning lens in the sub scanning direction is used for the synchronous detection. Thus, the light beam for synchronous detection is set to pass in the vicinity of the center of the scanning lens 54 having a little sink mark. Thereby, even when the scanning lens thermally expanded due to a thermal increase, the light having passed the scanning lens 54 can be prevented from varying in the sub scanning direction. It is therefore made possible to further reduce a shift in the detection timing when the light receiving surface of the synchronous detector 63 is tilted in the sub scanning direction.

Further, the light beam for synchronous detection is set to be incident on the central portion of the synchronous detector 63 in the sub scanning direction. Thereby, even when the light for synchronous detection is varied in the sub scanning direction because of an ambient change as a thermal change, the light can be certainly incident on the light receiving surface 63a of the synchronous detector 63. A failure of the synchronous detection can be prevented.

Further, an image forming device which forms an image on a recording medium comprises the photoconductor 41, and the writing device 5 or 5A as an optical scanner which scans the photoconductor 41 with light in accordance with image information to form a latent image on the photoconductor. By use of the writing device 5 or 5A, the image forming device can produce high-quality images with less positional shifts.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An optical scanner comprising:
   a light source including a plurality of light emitting elements;
   a polygon mirror which deflects light from the light source for scanning a surface of a subject;
   a scanning element on which the light deflected by the polygon mirror is incident; and
   a synchronous detector which detects the light having passed the scanning element for synchronous detection and generates a signal for controlling a timing at which the scanning of the surface is started, wherein:
   the light emitting elements of the light source are positioned differently from each other in a sub scanning direction, the sub scanning direction being along a rotational axis of the polygon mirror; and
   light other than light incident on a position closest to an end of the scanning element in the sub scanning direction is used for the synchronous detection.

2. The optical scanner according to claim 1, wherein the light for the synchronous detection is set to be incident on a central portion of the synchronous detector in the sub scanning direction.

3. An image forming device which forms an image on a recording medium, comprising:

a photoconductor; and the optical scanner according to claim 1 which scans the photoconductor with light in accordance with image information to form a latent image on the photoconductor.

* * * * *